United States Patent [19]

Hunter

[11] 3,900,837

[45] Aug. 19, 1975

[54] VARIABLY ADDRESSABLE SEMICONDUCTOR MASS MEMORY

[75] Inventor: John C. Hunter, Phoenix, Ariz.

[73] Assignee: Honeywell Information Systems, Inc., Phoenix, Ariz.

[22] Filed: Feb. 4, 1974

[21] Appl. No.: 439,677

[52] U.S. Cl....... 340/173 R; 340/173 BB; 340/172.5

[51] Int. Cl........................ G11c 13/00; G11c 11/40

[58] Field of Search....... 340/173 R, 173 DR, 172.5

[56] References Cited

UNITED STATES PATENTS

| | | | |
|---|---|---|---|
| 3,781,826 | 12/1973 | Beausoleic | 340/173 R |
| 3,798,617 | 3/1974 | Varadi | 340/173 R |
| 3,800,294 | 3/1974 | Lawlor | 340/173 R |

*Primary Examiner*—Terrel W. Fears
*Attorney, Agent, or Firm*—Walter W. Nielsen; Edward W. Hughes

[57] ABSTRACT

A block-addressable mass memory subsystem comprising wafer-size modules of LSI semiconductor basic circuits is disclosed. The basic circuits are interconnected on the wafer by non-unique wiring bus portions formed in a universal pattern as part of each basic circuit. A disconnect circuit isolates defective basic circuits from the bus. A variable address storage register is provided for each basic circuit. An inhibit chain interconnects all of the basic circuits, whereby one and only one basic circuit is responsive to store a unique address in its address storage register.

8 Claims, 28 Drawing Figures

VARIABLY ADDRESSABLE SEMICONDUCTOR MASS MEMORY

CROSS-REFERENCE TO RELATED APPLICATION

This application is related to U.S. patent application Ser. No. 439,459, filed on even date herewith entitled "Multiple Register Variably Addressable Semiconductor Mass Memory" by John C. Hunter.

BACKGROUND OF THE INVENTION

The invention relates generally to a memory subsystem for a data processing system, and more particularly, to a block-addressable random access store in which all of the active memory elements are comprised of conductor-insulator-semiconductor (CIS) devices formed as integrated circuits on a common substrate which may be, for example, silicon.

The memory subsystem of a data processing system is considered a hierarchy of store unit types in an order ascending in storage capacity and descending in the cost per unit of storage and the accessibility of the data stored. At the base of the mountain of data in the memory hierarchy is a mass of stored information available for use by the data processor, not immediately upon call, but only after a relatively long latent period or latency during which period the desired data is located, and its transfer to the data processor is commensed. Examples of media utilized by mass storage units are magnetic tape, punched paper tape and cards, and magnetic cards. Although the cost per unit of storage is extremely low, mass storage devices employing such media must physically move the media, consequently, they exhibit extremely long latencies.

Instantly visible at the summit of the memory hierarchy is a small, extremely fast working store capable of storing only a limited amount of often used data. Such ultra-fast stores, termed cache or scratchpad memories, are limited in size by their high cost. Intermediate the cache and mass stores in the memory hierarchy are the main memory and the bulk memories. The main memory holds data having a high use factor, and consequently, comprises relatively high speed elements such as magnetic cores or semiconductor devices. The cost per unit of storage for main memory is generally high but not so high as the cache memory.

Data processing systems requiring large storage capacities may employ bulk memory comprising additional high speed magnetic core or semiconductor memory. However, the high speed bulk memory is often prohibitively expensive, and slower, less expensive magnetic disc or drum devices, as for example, the type having a read/write head for each track of data on the surface of the device, are utilized. The tradeoff is characterized by extremely short, virtually zero latency (e.g., 500ns or less) and high cost giving way to long latency (10us) and lower cost. Still less expensive bulk memory devices having even longer latency may be utilized, e.g., magnetic discs or drums having movable heads, the so-called head per surface devices.

In the prior art bulk memories, the advantages of larger storage capacities and lower cost per unit of storage are attended by the disadvantage of longer latency. The present invention contemplates a new type of memory unit for replacing devices in the memory hierarchy between the cache store and the very low cost, high capacity, long latency mass storage devices.

The advantages of the present invention over the prior art are best realized in the environment of the modern large scale data processing system wherein the total storage capacity is divided into two functional entities, viz.: working store and auxiliary store. In earlier computer systems programs being executed were located in their entirety in the working store, even though large portions of each program were idle for lengthy periods of time, tying up vital working store space. In the more advanced systems, only the active portions of each program occupy working store, the remaining portions being stored automatically in auxiliary store devices, as for example, disc memory. In such advanced systems, working store space is automatically allocated by a management control subsystem to meet the changing demands of each program as it is executed. A management control subsystem is a means of dynamically managing a computer's working store so that a program, or more than one program in a multiprogramming environment, can be executed by a computer even though the total program size exceeds the capacity of the working store.

Modern data processing systems thus are organized around a memory hierarchy having a working store with a relatively low capacity and a relatively high speed, operating in concert with auxiliary store having relatively great capacity and relatively low speed. The data processing systems are organized and managed so that the vast majority of accesses of memory storage areas, either to read or to write information, are from the working store so that the access time of the system is enhanced. In order to have the majority of accesses come from the relatively fast working store, blocks of information are exchanged between the working store and auxiliary store in accordance with a predetermined algorithm implemented with logic circuits. A "block" defines a fixed quantity of data otherwise defined by terms such as pages, segments, or data groups and which quantity is a combination of bits, bytes, characters, or words. A program or subroutine may be comprised of one or more data blocks. A data block may be at one physical storage location at one time and at another physical storage location at another time, consequently, data blocks are identified by symbolic or effective addresses which must be dynamically correlated, at any given time, with absolute or actual addresses identifying a particular physical memory and physical storage locations at which the data block is currently located. The speed of a data processing system is a function of the access time or the speed at which addressed data can be accessed which, in turn, is a function of the interaction between the several memories in the memory hierarchy as determined by the latency of the auxiliary store devices.

From a total system point of view, therefore, the most desirable characteristic of an auxiliary store is the ability to address a data block directly (i.e., virtual address) and have the block of data automatically moved to the working store, the latency determined only by the transfer rate of the exchange alforithm implemented in the central system. Ideally, the auxiliary store should be able to adjust its data transfer rate instantaneously to adapt to queueing delays at the working store processor interface, thus providing the fastest possible transfer rate while accounting for variable system loading on the working store. In view of the above background, the disadvantages of the prior art auxiliary stores having mechanically rotated magnetic storage media are apparent in that the prior art systems are characterized by relatively long latency and a fixed minimum transfer rate dictated by mechanical constraints.

Accordingly, it is desirable to provide a relatively inexpensive, variable record size, block-transfer auxiliary store for storing mass quantities of data, and connected for communication with the working store to supply programs and information to the working store as required for processing, and to provide temporary storage for processed data accepted from the working store, prior to transfer of the processed data to an output device, and yet to provide such interchange of data blocks with virtually zero latency.

It is further desirable to provide an auxiliary store useable in a virtual memory system in which variable addresses may be freely assigned to blocks of data and in which the necessity for fixed addressing has been eliminated. As a result memory compaction within the memory subsystem can be accomplished simply by reassigning addresses rather than by writing information into a new memory location. Also, in a paged memory system, the necessity for page tables (relating virtual addresses to absolute addresses) and core maps (lists of free and used space) has been eliminated, resulting in substantial savings in memory space and memory cycle time.

Semiconductor large scale integration (LSI) inherently provides the design flexibility, reliability, size, and cost for implementing such an auxiliary store.

In the prior art there are three basic approaches for fabricating LSI devices. The first uses a technique commonly termed "discretionary wiring," wherein groups of identical basic circuits are interconnected with multilevel metallization to provide a number of complex functions on a single semiconductor slice. The technique is characterized by the fabrication on a semiconductor wafer of as many useful basic circuits as are needed for the construction of the larger circuits. The basic circuits are generally logical configurations, trigger stages and the like which are relatively simple circuits when compared with the monolithic circuits described above. The basic circuits are interconnected to form larger elements, as for example, shift registers, storage arrays, or an arithmetic unit. Each basic circuit is tested prior to interconnection and only the operable circuits are connected and used to form the final element. An automatic tester having a multipoint probe is controlled by a computer to test each of the basic circuits. The multipoint probe is moved or stepped sequentially to make contact with and test each of the basic circuits for predetermined circuit functions. The resulting test information is stored on magnetic tape for processing in a high speed computer. Subsequent to the testing, the computer generates discretionary interconnection pattern data from the stored test results, the data defining a pattern which connects only operative basic circuits and bypasses defective circuits on the wafer. The interconnection pattern data is then fed to an automatic mask generation system which photographically produces a unique discretionary mask. Utilizing the unique mask, leads are then etched to interconnect the operative basic circuits. While the discretionary wiring technique provides a very high level of circuit integration, the method is disadvantageous in that a separate mask is necessary for each wafer in order to establish the connections between the useful basic circuits. Each unique mask is useless after it has once been used.

The second known technique uses carefully controlled, improved yield and a custom interconnection pattern to form a single monolithic circuit. This approach produces a plurality of interconnected unique circuit elements on a common substrate by means of the known diffusion, masking, and vapor-deposition techniques. A complex monolithic circuit often with several thousand unique circuit elements is thus formed. A plurality of such large circuits can advantageously be accommodated on one semiconductor substrate and contact made to them. A disadvantage, however, is the low yield associated with the process because of the probability that one of the plurality of unique circuit elements comprising the monolithic circuit will be defective. If only one of the unique circuit elements is bad the entire monolithic array of circuits is useless and must be discarded.

The third approach is described in U.S. patent application Ser. No. 307,317, now U.S. Pat. No. 3,803,562, filed Jan. 12, 1972, entitled "Semiconductor Mass Memory," by John C. Hunter, and assigned to the assignee of the present invention. Therein is described, in one embodiment, a memory subsystem in which a plurality of LSI memory arrays interconnected by a common intrinsic bus are fabricated on an uncut wafer of semiconductor material. After fabrication, each array is successively tested with a multiprobe step-and-repeat tester, and a unique address is assigned to and stored in each operative array. Inoperative arrays are electrically disconnected from the bus by a disconnect device formed as a part of each array. While this approach overcomes the disadvantages of the prior two approaches, it necessitates the assignment of a semi-permanent unique address to each array as part of the post-fabrication process. This has the disadvantage of requiring page tables in the memory system to translate virtual addresses into absolute addresses. It also lengthens the fabrication time. In addition, this approach has a tendency to waste the capacity of high yield wafers or to reject low yield wafers, because of the fabrication constraint that each active substrate or "assembly" consist of at least $2^N$ addressable arrays, where N is the address space. This constraint is inherent in the fabrication process, whereby a sufficient number of "groups" are joined together into an "assembly" of $2^N$ good arrays. The optimum "assembly" size is dictated in part by the limitations of the testing and addressing apparatus. Any excess number of good arrays at the "assembly" level is therefore wasted. Furthermore, there are spatial restraints on the usage of low yield wafers.

SUMMARY OF THE INVENTION

Accordingly, it is desirable to provide a large scale integrated array comprising a plurality of variable-yield identical basic circuits, wherein the basic circuits are interconnected by a non-unique wiring arrangement permitting selective disconnection of defective circuits, and wherein the basic circuits each may be variably addressed by the memory subsystem.

Therefore, it is the principal object of this invention to provide an improved semiconductor memory subsystem for a data processing system.

Another object of the invention is to provide an improved virtually zero latency auxiliary store for a data processing system.

Another object of the invention is to provide in a data processing system an improved auxiliary store which serves to reduce the size and accordingly the cost of the working store.

Another object of the invention is to provide an improved auxiliary store comprised of semiconductor LSI circuits.

Another object of the invention is to provide a solid state storage subsystem for replacing storage devices having mechanically driven magnetic media.

Another object of the invention is to provide an improved storage subsystem for a data processing system wherein the active elements are comprised of integrated circuits fabricated on a substrate of semiconductor material, with packaging introduced at the wafer level. Another object of the invention is to provide a low cost, virtually zero latency, variable record size, block transfer, auxiliary store connected for communication with the working store of a data processing system, which auxiliary store affords more effective utilization of working store space.

Yet another object of the invention is to provide an improved memory subsystem for a data processing system wherein the active memory elements may each be assigned and reassigned unique addresses according to the state of the memory elements.

A further object of the invention is to provide an improved memory subsystem comprised of selectively disconnectable semiconductor LSI circuits, wherein the active memory elements are interconnected by an inhibit mechanism permitting one and only one memory element to store a unique address.

Another object of the invention is to provide an improved memory subsystem comprised of selectively disconnectable semiconductor LSI circuits, wherein one and only one of the active memory elements responds to memory function commands associated with a unique address signal.

These and other objects are achieved according to one aspect of the invention by providing a memory subsystem in which a plurality of LSI memory arrays interconnected by a common intrinsic bus are fabricated on an uncut wafer of semi-conductor material. Each array contains a variably addressable address register for storing a unique address assigned to the array by the data processing system in the course of processing operations. An inhibit circuit links all arrays on all wafers so that from the pool of unassigned arrays, one and only one array is responsive to store a unique assigned address. Each array is successively tested during the fabrication process with a multiprobe step-and-repeater tester, and inoperative arrays are electrically disconnected from the bus by a disconnect device formed as a part of each array.

BRIEF DESCRIPTION OF THE DRAWING

The invention will be described with reference to the accompanying drawing, wherein:

FIG. 8 including

DESCRIPTION OF THE PREFERRED EMBODIMENT

Data Processing System — General

Figure 1:
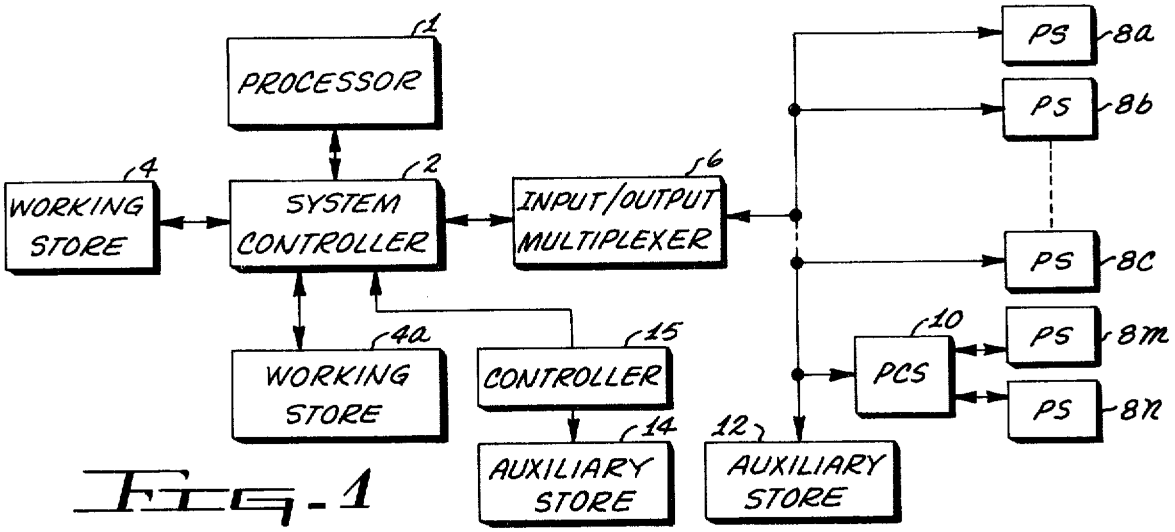
FIG. 1 is a generalized block diagram of a data processing system.

Referring now to the drawing, and in particular to FIG. 1, there is shown a block diagram of a typical data processing system having a processor 1 connected via a system controller 2 to a working store 4 and an input/output multiplexer (IOM) 6. Additional modules 4*a* of working store may be provided. Connected to the IOM 6 are a plurality of peripheral subsystem devices 8 for supplying input data and receiving output data. One or more of the devices 8*n*, 8*m* may be connected for communication with the IOM 6 via a peripheral subsystem controller 10. For detailed descriptions of the components of a typical data processing system refer to U.S. Pat. Nos. 3,588,831; 3,413,613 and 3,409,880. A detailed description of an IOM may be found in copending application Ser. No. 108,284 now U.S. Pat. No. 3,701,382, filed by Hunter et al. and assigned to the same assignee as the present invention. An auxiliary store 12 may be connected to the IOM 6. Alternatively, an auxiliary store 14 may be connected for communication with the data processing system via a subsystem controller 15.

Figure 2:
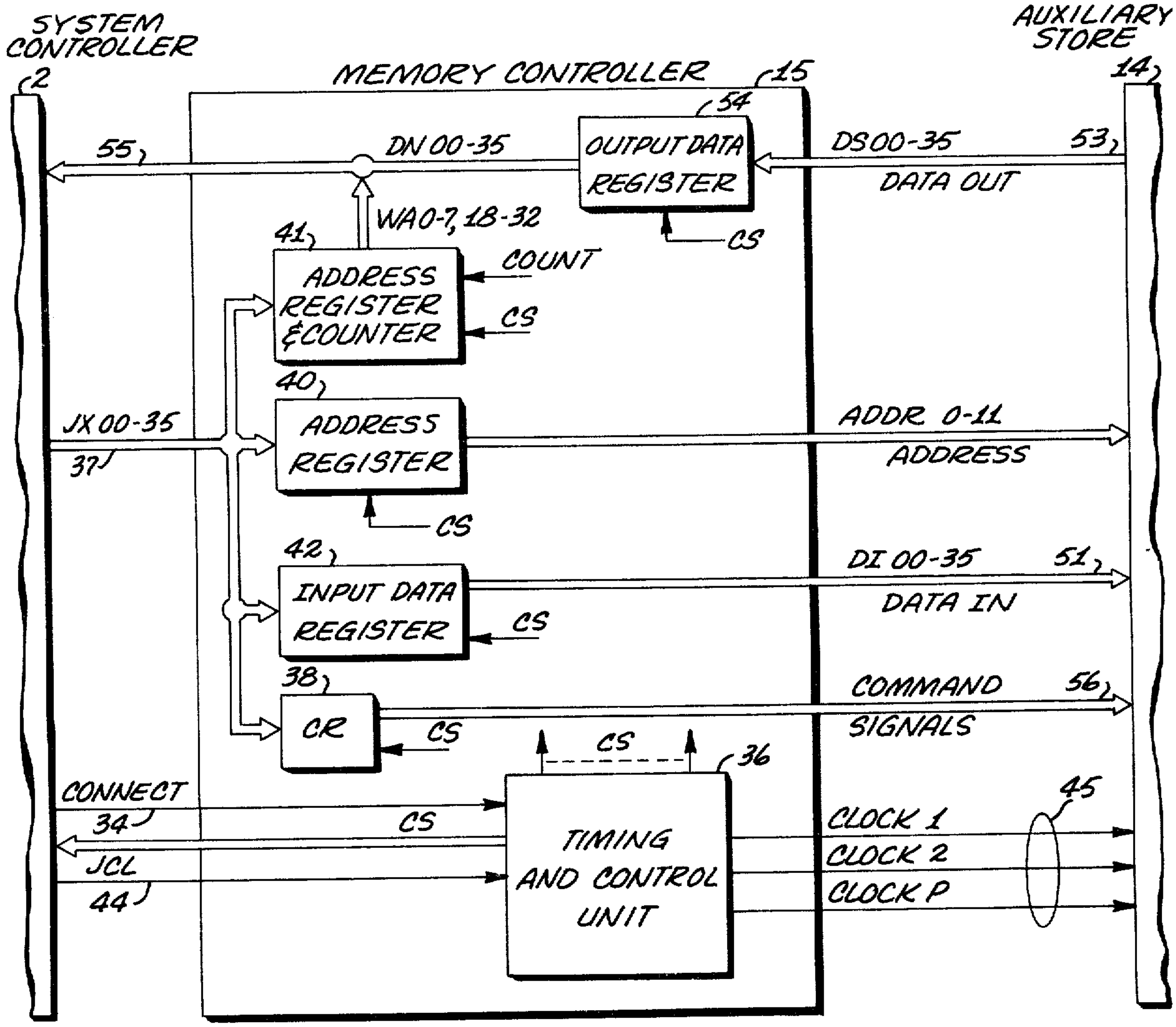
FIG. 2 is a block diagram of a controller.

The controller organization, shown in greater detail in FIG. 2 is representative of and compatible with known controller arrangements. The controller forms no part of the present invention, consequently, the structure of the controller is described with detail sufficient only to establish the interface between the auxiliary store 14 and the data processing system. The structure of the controller 15 and the details of its operation are typical; a more detailed description may be found in the aforementioned U.S. patents and application of Hunter et al.

The system controller 2 initiates an exchange of data between the auxiliary store 14 and the central system by supplying a connect signal to the controller 15 via interface lead 34. A timing and control unit 36 serves to receive signals and pulses from other units within the data processing system and to generate control signals and timing pulses for controlling internal operations of the controller 15, and concurrently with and in response to the internal operations generate other control signals and timing pulses for transfer to the other units in order to maintain synchronization between the independently operating components of the system. The exact manner in which specific control signals, generally designated CS in FIG. 2, are logically derived and timing pulses are generated according to precisely defined conditions within a data processing system at certain precisely defined times has become a matter of common knowledge in the art. Reference is again made to the aforementioned U.S. patents for such detail.

The timing and control unit 36 responds to the connect signal to transfer information signals JX00-35 to the various components of the controller 15 at the appropriate times, as the JX00-35 signals are enabled onto an information signal bus 37 from the system controller 2. Information signals JX00-35 comprising command, address, and data information are transferred, respectively, to a command register 38, address registers 40, 41 and an input data register 42. Synchronous operation between the system controller 2 and the auxiliary store 14 may be achieved by supplying clock pulses JCL, which may be, for example, working store timing pulses, via interface line 44 to the timing and control unit 36. Alternatively, clock pulses may be generated by a master clock (not shown) in the timing and control unit 36. In the preferred embodiment, three clock signals are supplied by the controller 15 to the auxiliary store 14 via a clock bus 45.

Output signals ADDRO-11 of the address register 40 identify a unique address in each one of a plurality of assemblies of the auxiliary store 14. The addressing and organization of the data in the auxiliary store 14 will be discussed in more detail later.

Input data is trasferred to the auxiliary store 14 as signals DI00-35 on a DATA IN bus 51. Output data signals DS00-35 from the auxiliary store 14 are transferred via a DATA OUT bus 53 to an output data register 54. The output data signals are subsequently transferred as signals DN00-35 to the system controller 2, along with working store address signals WA0-7, 18–32. The WA00-19 signals originate in the address register and counter 41 and are derived from the working-store address component of information signals JX00-35. The working-store address held in the address register and counter 41 is incremented in response to a COUNT control pulse from the timing and control unit 36 each time a new data item represented by output data signals DS00-35 is transferred to the output data register 54. Command signals derived from the contents of the command register 38 and transferred to the auxiliary store 14 via interface lead 56 control the operation of the auxiliary store as will be explained hereinafter.

In a multiprocessing environment, several programs or program segments may be resident in the working store at the same time in various stages of execution. Execution of certain of the resident programs will often be delayed due to a need for an auxiliary store access to retrieve another segment of the program or to call another program into action from the working store. The programs are delayed for a length of time equal to the access time of the auxiliary store plus queueing delays inherent in the exchange algorithm of the management control subsystem. A management control subsystem for a data processing system is the subject of U.S. Pat. No. 3,618,045, assigned to the same assignee as the present invention. "Access time" is defined as the time interval between the instant the control unit calls for a transfer of data to or from the store and the instant the operation is completed. The access time is the sum of the latency of the store and transfer time. The "transfer time" is the time interval between the instant the transfer of data to or from the store commences and the instant it is completed. There must be a sufficient number of program segments resident in the working store to allow the processor to continue working as the aforementioned program execution delays occur. If average access time is shorter, then fewer programs need to be resident in working store, and less working store is required.

The present invention finds utility in multiprocessing, virtual memory systems such as the MULTICS system. Complex and time-consuming memory management routines, such as memory compacting routines, page tables, and core maps are eliminated, thus substantially decreasing the average access time and reducing the working store size.

Regarding memory compacting, it is understood that during the process of allocation and deactivation of memory segments, "holes" in the address space can appear. More often than not these "holes" are not completely filled by new allocations, and unuseable fragments of space are left scattered around the memory. Left unchecked, a sizeable fraction of the total memory space will accrue. Memory compacting routines are commonly used to periodically move all resident data toward the low end of the address space, filling unused fragments and opening up a large pool of available space at the high end of the address space. To compact the memory space, data is read out of its old address location and rewritten into its new location at the low end of the address space. Data transfer of this nature is time-wasting. For example, reading and rewriting the contents of a 512-bit shift register requires 1024 memory cycles.

The present invention accomplishes memory compaction simply by reassigning addresses within the memory. An entire memory segment can be assigned a new location by changing the address stored in the address registers of the arrays making up the memory segment. This is accomplished in one memory cycle, representing a gain of 1024:1.

In memory systems employing fixed or absolute addressing, page tables are required to relate the address assigned to a page of the memory segment (virtual address) to the physical address in the memory system where the page is actually stored (absolute address). For each data transfer, the page table must be consulted adding one or more extra memory cycles. Page tables are eliminated in the present invention, since addresses can be freely assigned throughout the memory. The address assigned to any given portion of memory is simply the page number rather than some arbitrary physical address.

Core maps, which list free and used memory space, are also done away with in the present invention, further decreasing memory transfer time. Through the use of an inhibit chain, first linking arrays within a group, then groups within an assembly, and then a plurality of assemblies, together into a pool of unused arrays, a free space list is automatically created through the use of hardware, so that any new address to be assigned is in fact assigned to the top of the free space list. Used arrays are automatically dropped from the free space list until such time as they are set free, whereupon they rejoin the free space list by virtue of their being reabsorbed into the inhibit chain.

Data Store Subsystem — Physical Description

The general terms used to describe the separate physical elements of my invention are defined as follows:

An "array" comprises a plurality of electrically connected storage cells, an input-output bus portion, and overhead circuits including a disconnect device. Each cell stores one bit of information. The array is the smallest addressable physical entity. An absolute address is stored in the overhead circuits of each array. The terms "basic circuit" and array are used interchangeably.

A "group" comprises a plurality of electrically connected arrays on a common substrate. The group is operative with an aribtrary number of defective arrays. The group is defective if a disconnect device or an input-output bus portion is defective.

A "module" comprises one or more electrically isolatable groups on the same substrate or wafer. The module is operative with an arbitrary number of defective groups. Packaging is introduced at the module level. The terms "wafer" and module are used interchangeably, however, a wafer is generally considered an unpackaged module. An "assembly" comprises one or more modules together with external circuit packages, e.g., clock drivers and sense amplifiers. The number of operative addressable arrays in the assembly is constrained to be an integer power of the radix of the address number, according to one embodiment of the invention. According to an alternative embodiment of the invention (FIG. 10), the number of operative arrays in the assembly may be variable, provided that the total number of arrays in an interconnected group of assemblies is an integer power of the radix of the address number.

A "segment" of store comprises a plurality of assemblies, or groups of assemblies, each assembly or group of assemblies having a separately connected data input lead and a separately connected data output lead, the assemblies having common address lines thereby forming a block-addressable store.

A "card" comprises one or more assemblies on a printed circuit board.

An organizational element of the auxiliary store (i.e., an element which does not delineate a separable physical element) is a "data block." The data block is a fixed quantity of data which is a combination of bits, bytes, characters or words.

Data Store Subsystem — General

Figure 3:
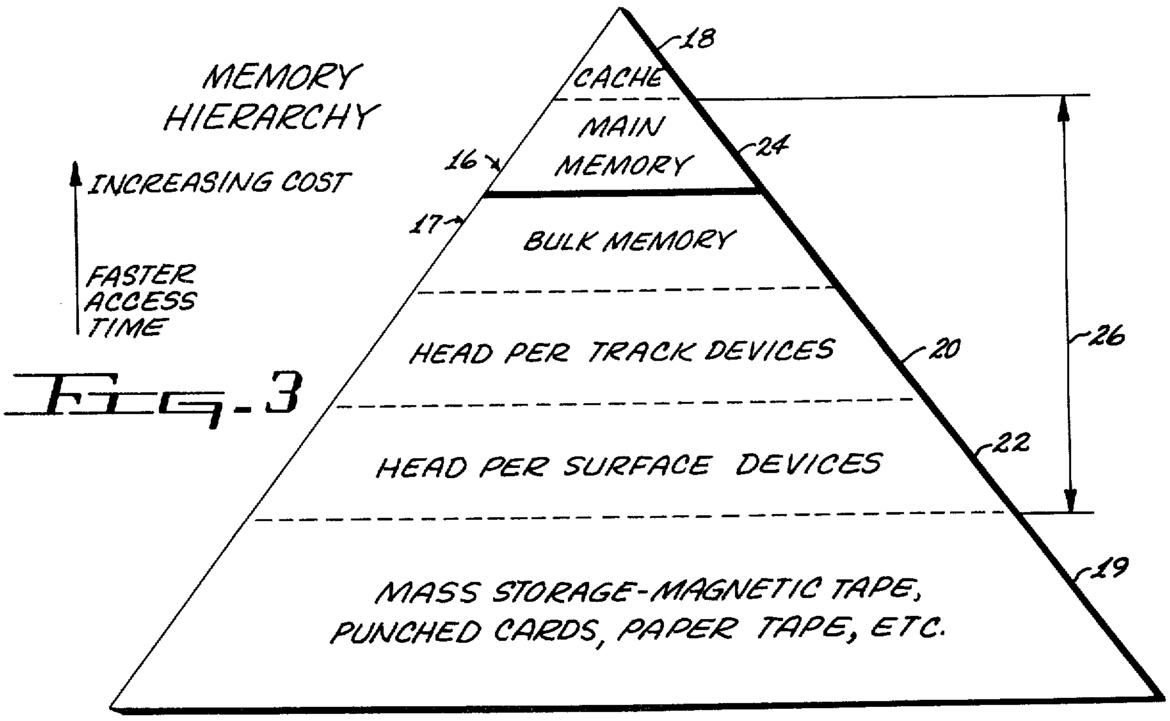
FIG. 3 is a diagrammatic representation of a memory hierarchy in a data processing system.

The various storage components in a data processing system form what is termed a memory hierarchy. FIG. 3 is a diagrammatic representation of a typical memory hierarchy having a working store 16 and an auxiliary store 17. The size of the areas within the large triangle of FIG. 3 represents the relative storage capacity of the various devices and functional entities represented. Thus a cache memory 18 has the smallest storage capacity, and mass storage devices 19 such as magnetic tape store voluminous amounts of data. The position of the various components of the memory hierarchy in the FIG. 3 diagram is an indication of both the relative cost per unit of storage and the access time inherent in the devices. For example, head per track devices 20 have a higher cost per unit of storage and a faster access time than head per surface devices 22. Main memory 24 generally comprises one or more fast access, zero latency, high cost per bit devices such as a coincident current magnetic core memory or a semiconductor device memory. The latency of a computer store is defined as the time interval between the instant the control unit (e.g., IOM 6 or controller 15 of FIG. 1) signals the details (E.G., the address) of a transfer of data to or from the store and the instant the transfer commences. The working store 16, as a functional entity, may include or in some system architectures be limted to the ultra-fast cache memory 10.

Still referring to FIG. 3, the present invention provides an LSI semiconductor store unit suitable for replacing units in the memory hierarchy in the range represented by the arrow 26. The most significant effect of the present invention on system architecture is a reduction in the size of the working store 16.

Figure 9:
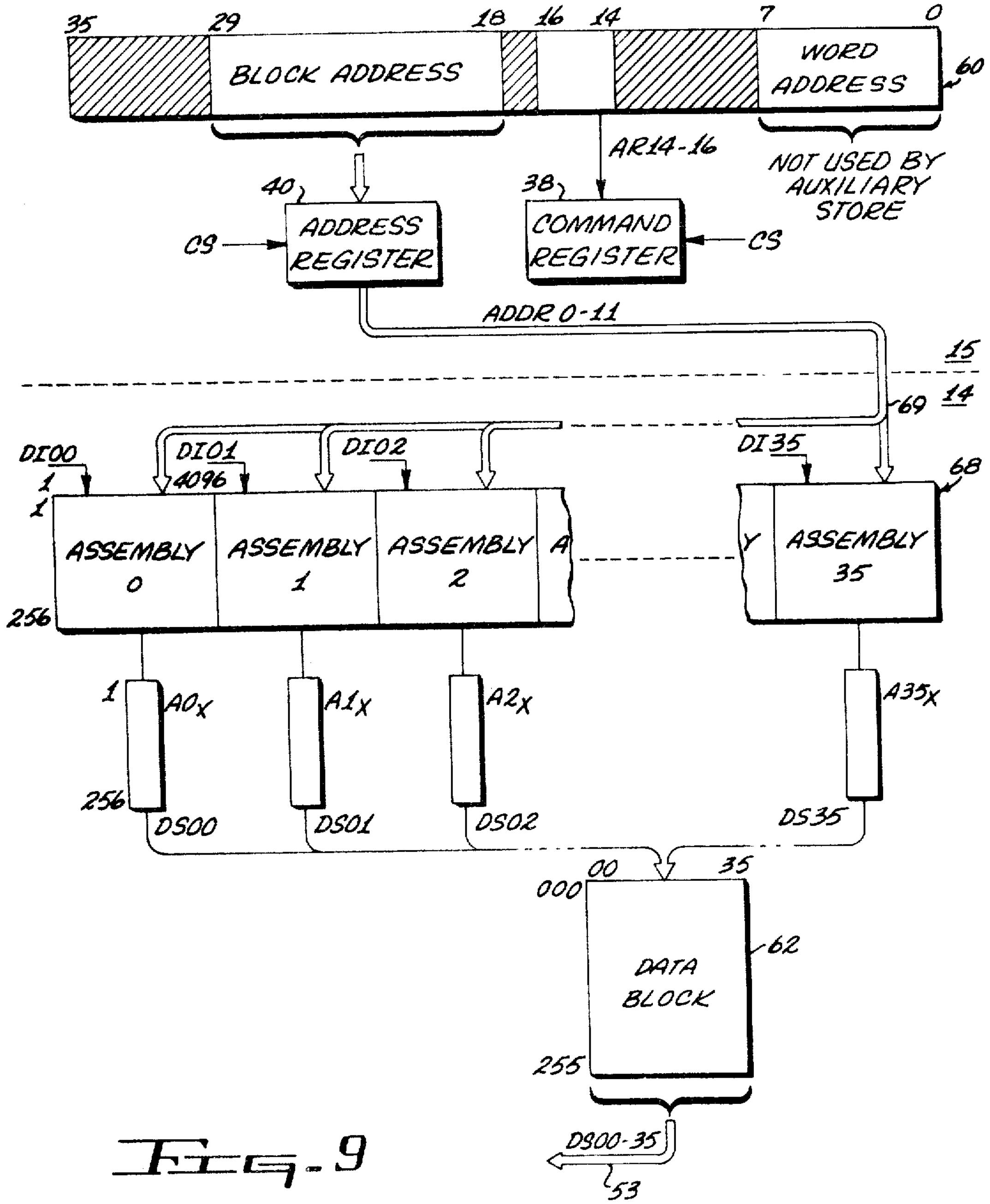
FIG. 9 is a block diagram illustrating the organization of one embodiment of a data processing system store.

A typical physical organization for the auxiliary store of my invention and an exemplary addressing arrangement are shown in FIG. 9. A data item 60 is diagrammatically illustrated omprising command and address information. The data item length was arbitrarily chosen as 36 binary digits for describing a typical arrangement. The choice of either a 36-bit word, or any other of the numbers delimiting store size, is not intended to limit in any way the scope of the invention. In the illustrative embodiment, bits 0–7 of data item 60 are representative of the absolute address of a word within each one of a plurality of data blocks. A data block 62 is diagrammatically illustrated in FIG. 9 comprising 9,216 bits of data arranged as 256 36 bit words. The data block is the smallest addressable entity of store in the auxiliary store 14 being described with reference to FIG. 9. Address bits 0–7 of data item 60, being word identifiers, are therefore not transferred to the auxiliary store 14, but are held in the address register and counter (41 FIG. 2) of the controller 15. Address bits 0– 7 are incremented binarily each time a word of a data block is transferred from the auxiliary store 14 to the controller 15, and used for supplying a word address to the working store.

Still referring to FIG. 9, bits 18–29 of data item 60, representative of a block address, are transferred as the ADDR0-11 signals to the address register 40. In response to an enable CONTROL SIGNAL (CS), the address register 40 transfers address signals ADDR0-11 to a segment of auxiliary store 14. A single segment 68 is diagrammatically represented in FIG. 9 comprising 36 assemblies labelled ASSEMBLY 0,1,2 . . . 35. ASSEMBLY O is typical and represents a physical entity or store having a storage capacity of 256 × 4096 or 1,048,576 bits of data. An assembly contains 4096 arrays of store, each array storing 256 bits of data. One representative array from each of the ASSEMBLIES 0,1, . . . 35 is diagrammatically represented in FIG. 9 and labelled, respectively, $AO_x$, $Al_x$ . . . $A35_x$. The ADDRO-11 address signals are transferred to each of the ASSEMBLIES 0,1 . . . 35 of the segment 68 via an address bus 69. During a write operation, DATA IN signals DIOO-35 are transferred from the input data register (42 FIG. 2), each to the corresponding ASSEMBLY 0,1 . . . 35 of the segment 68, as shown in FIG. 9. Thus, for any given address *x*, data is written into 36 storage arrays $AO_x$, $Al_x$ . . . $_{A35x}$,one from each of the ASSEMBLIES 0,1 . . . 35 of the segment 68. Similarly, during a read operation from address x, the contents (256 bits each) of arrays $AO_x$, $Al_x$, $A2_x$ . . . $A35_x$ are transferred, each array serially by bit, as signals DSOO,01,02 . . . 35 to the controller 15 via the DATA OUT bus 53. Thus, an addressed data block is transferred serially by word from the auxiliary store 14 to the controller 15.

The binary representation of bits 14–16 of the data item 60 determines the type of operation performed for the corresponding address: READ, WRITE, STORE ADDRESS, SET FREE, INITIALIZE, and REFRESH (two of the possible eight binary combinations are unused). The bits 14–16 command information (AR14-16) is held in the command register 38 during execution of the operation.

Figure 10:
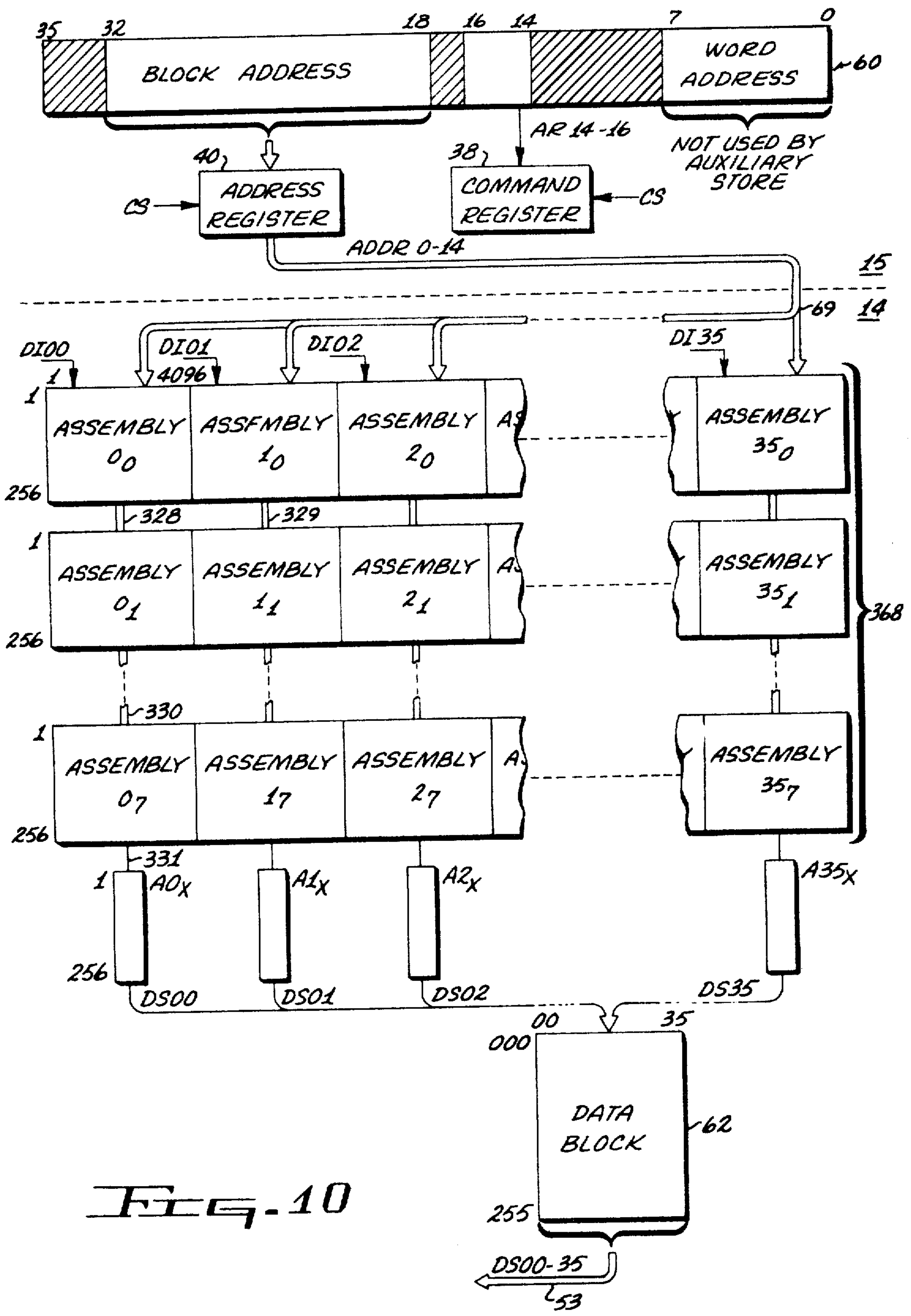
FIG. 10 is a block diagram illustrating the organization of an alternative embodiment of a data processing system store.

FIG. 10 illustrates an alternative enlarged arrangement of the auxiliary store 14 in which the memory segment 68 shown in FIG. 9, comprising 36 assemblies, has been expanded eight-fold into a memory segment 368 comprising 36 groups of eight assemblies each. One group of eight assemblies, for example, comprises assemblies $0_0$–$0_7$; a second group comprises assemblies $1_0$–$1_7$; and so on. Each group of eight assemblies is interconnected by a common bus carrying data, address, and control signals. Bus segments 238 and 330, for example, form portions of a common bus linking assemblies $0_0$–$0_7$. The common busses linking the eight associated assemblies of any one group of assemblies also carry inhibit propagation circuitry, which may be of the type illustrated in FIG. 21 and described hereinafter. The inhibit circuitry serves to link all unaddressed, good arrays within a particular group of 8 assemblies together into a "free space" pool, and ensures that one and only one array in each group of eight assemblies responds to a particular unique address transmitted to the segment 368 over address bus 69. The total number of addressable arrays per group of eight assemblies is 8 × 4096 = 32,768 (or $2^{15}$). In order to address any of the $2^{15}$ arrays within the expanded segment 368 of FIG. 10, the address bandwidth has been expanded to 15 bits comprising bits 18–32 of data word 60. It will be understood that any integer power of 2 number of assemblies may be so grouped to form a segment of store and that the grouping of eight assemblies is merely illustrative of the manner in which the auxiliary store of the present invention may be expanded.

Figure 5:
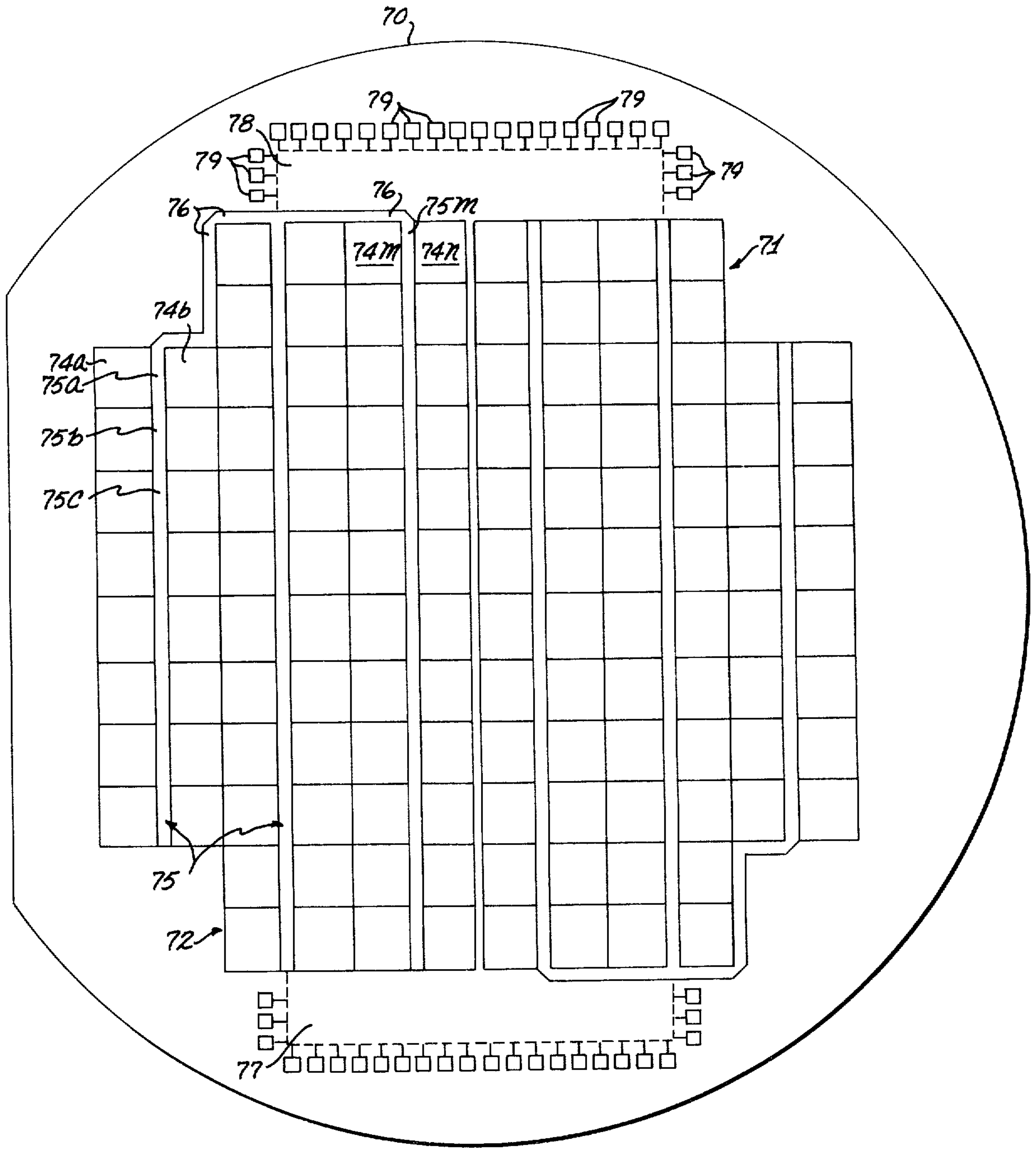
FIG. 5 is a diagrammatic plan view of a wafer having a plurality of basic circuits formed thereon in accordance with the invention.

FIG. 5 illustrates one embodiment of a module prior to packaging comprising a substrate 70 having two groups 71,72 of arrays. Each group includes 64 arrays in pairs, e.g., in the left-hand group 72, the array-pair 74*a*,74*b*. Formed as an integral part of and interconnecting the arrays is an input-output bus 75. The bus 75 comprises a plurality of bus portions 75*a*,*b*,*c*, . . . *m* . . . . Each bus portion bisects an array pair, e.g., bus portion 75*m* bisects two arrays 75*m*,75*n*. Associated with and adjacent to each group 71,72 is a corresponding group overhead area 77,78. The group overhead areas 77,78 provide space for supplementary circuits such as group clock drivers, and include a plurality of pads 79 for attaching conductive leads which connect the group to external connectors (not shown). The input-output bus 75 is connected to the overhead area 78 by a group bus 76.

Figure 12:
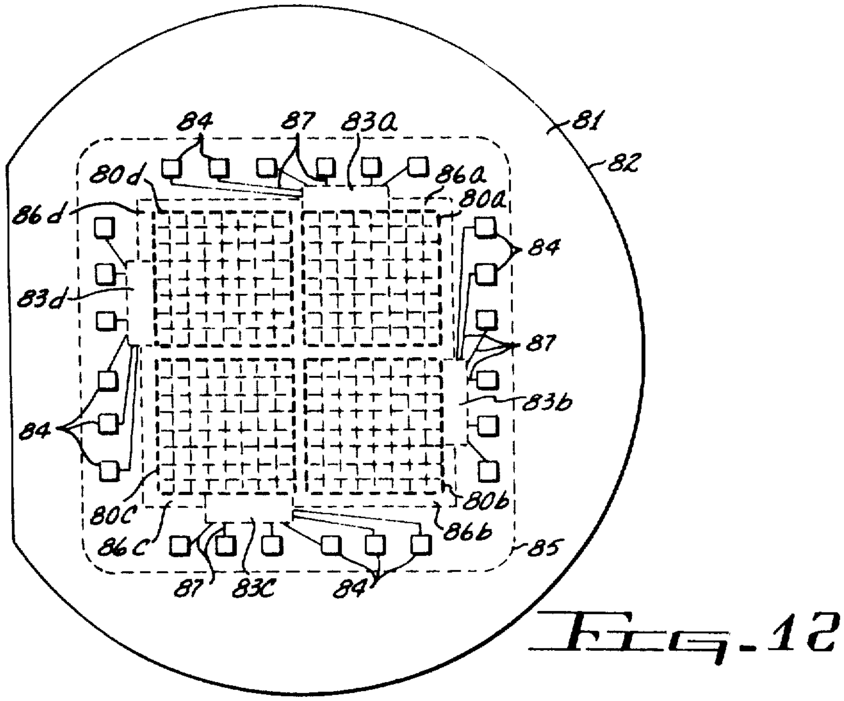
FIG. 12 is a diagrammatic plan view of a wafer having several groups of arrays formed thereon.

FIG. 12 is a plan view of another embodiment of a wafer prior to packaging showing an organization comprising four groups 80*a*,*b*,*c*,*d* formed on a surface 81 of a substrate 82. Each group 80*a*,*b*,*c*,*d* comprises 64 arrays as represented by the dashed lines lying within the perimeter of each group. Associated with each group 80*a*,*b*,*c*,*d* is a corresponding group overhead area 83*a*,*b*,*c*,*d*. Twenty-four contact pads 84 are disposed around the periphery of the wafer 80 within the bounds of a wafter trim line 85. Smaller pads 79 (see FIG. 5) associated with each of the overhead areas 83*a*,*b*,*c*,*d* are not shown in FIG. 8. The wafer organization illustrated in FIG. 12 reflects an alternate mode of making external connections during manufacture of the wafer. FIG. 5 illustrates a module having 24 pads 79 per group for making external connections. The alternate embodiment of FIG. 12 illustrates an arrangement having another level of contact pads 84 relatively massive in comparison with the pads 79 of FIG. 5. In the FIG. 12 embodiment, each one of the 24 pads (not shown) of each of the four group overhead areas 83 is connected to corresponding ones of the 24 pads in the other group overhead areas 83. Thus, the common signals of the groups 80*a*,*b*,*c*,*d* are bussed together via a group interconnect bus 86*a*,*b*,*c*,*d* to form a large single group. The large single group may, however, to partitioned into smaller groups by severing one or more of the group interconnect busses 86*a*,*b*,*c*,*d*. Similarly, defective smaller groups may be isolated from the larger groups, e.g., group 80*c* may be isolated from the larger group comprising groups 80*a*,*b*, and *d*. A group may be isolated by means of frangible sectors separable by any suitable energy source including thermal, electrical, radiant, mechanical, electron beam, etc. Alternatively, a disconnect circuit, as for example the type disclosed hereinafter, may be utilized.

Electrical conductors 87 which may be, for example, fly wires, mask deposited metal leads, and/or diffused runs connect the pads (not shown) of the group overhead areas 83 to the module contact pads 84. Alternatively, each group 80*a*,*b*,*c*,*d* may be arranged to have individual external electrical connections in which case 96 module contact pads 84 would be provided.

Figure 25:
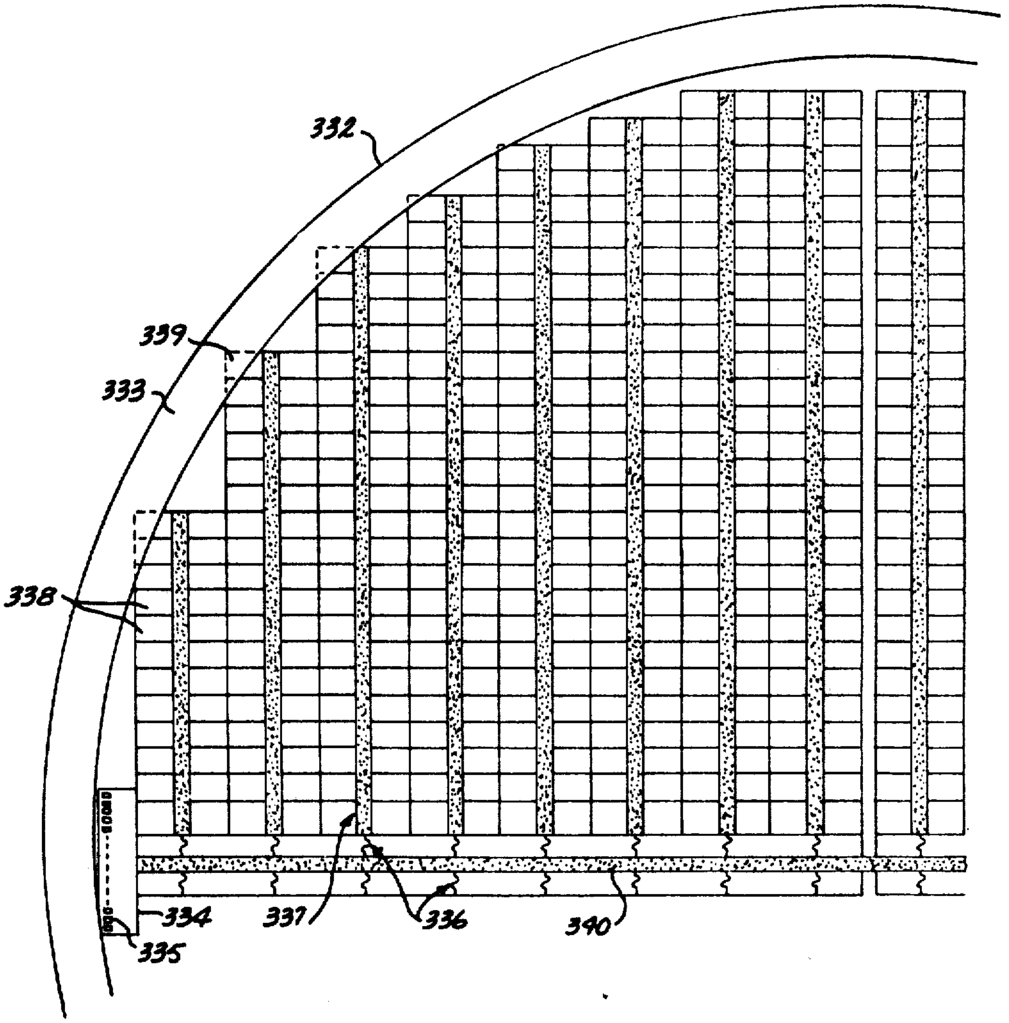
FIG. 25 is a diagrammatic plan view of a portion of a wafer having several groups of arrays formed thereon, in accordance with an alternative embodiment of the invention.

FIG. 25 is a plan view of a portion of a wafer prior to packaging and represents yet another embodiment of the organization of arrays on the wafer. The main bus 340 passes through the center of the wafer 332 and is connected to bonding pads 335 in bond overhead area 334. Group busses 337 connect to main bus 340 through frangible sectors 336, which may take the form of fuses or voltage-programmable transistors. Group busses 337 extend at right angles off main bus 340 until they reach the edge of the low yield zone 333 which is approximately 100 mils from the wafer edge. The array portions shown with dotted lines e.g. array portion 339, represent portions of arrays extending into the low yield zone 333. These arrays are in all likelihood non-functional and are not counted in the total array/wafer yield. The chief difference between the wafer organization shown in FIG. 25 and that shown in FIGS. 5 and 12 lies in the fact that the group size (number of arrays/group is variable on the wafer and determined by the wafer geometry. The FIG. 25 arrangement achieves maximum wafer packing density by utilizing all available space on the circular silicon wafer.

The modules shown in FIGS. 5,12 and 25 are not drawn to scale, the groups being greatly enlarged to facilitate description A typical group having 64 256-bit arrays actually occupies an area of about 1 square cm. An illustrative embodiment of the auxiliary store of my invention comprises modules having circular silicon substrates originally 8 cm in diameter trimmed to square substrates having an active area 5 cm on a side. Each substrate has 1600 arrays formed thereon. Of the 1600 arrays, about 70% or 1120 are usable; actual yields have been found to be higher. The module may consist of a single group containing a large number of usable arrays or several groups each containing a lesser number of arrays. The actual number of good arrays per group or per module is not a material factor. Groups having a substantial number of defective arrays (i.e., low yield groups) may be used to equal advantage as groups containing a high percentage of good arrays (high yield groups). Assuming there are 12 address lines in the input-output bus, an assembly comprises $2^{12}$ or 4096 separately addressable arrays. The illustrative embodiment is therefore modularly expandable in units of 4096 good arrays. In practice a larger number of good arrays may be incorporated into each assembly to provide replacements for arrays which may become defective through shipping, handling, or field usage.

Figure 4:
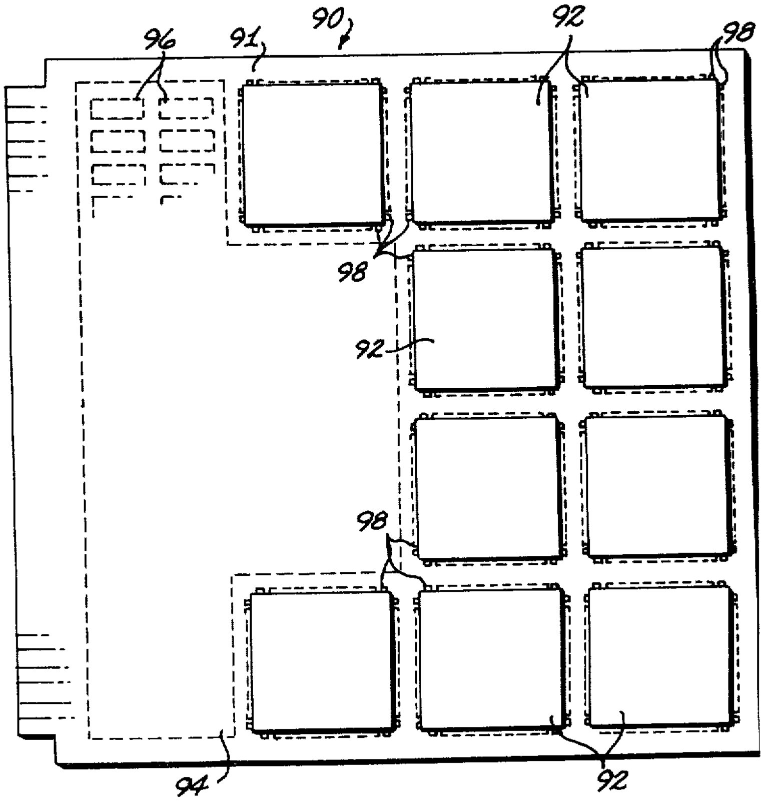
FIG. 4 is a plan view of a printed circuit board having a plurality of modules mounted thereon.

FIG. 4 illustrates a typical card 90 which may be, for example, a multilayer printed circuit board 91 having 10 modules 92 mounted thereon. An area 94 of the card 91 is reserved for the placement of circuit packages 96 comprising assembly elements such as clock drivers and sense amplifiers. Details of the circuits and the circuit interconnections at the card level are not described or shown herein as such details are well known in the art and described in the literature. See Electronic Digital Components and Circuits by R. K. Richards, D. Van Nostrand Company, Inc. 1967; and Handbook of Materials and Processes for Electronics, edited by Charles A. Harper, McGraw-Hill, 1970, paragraphs 13 and 14.

Each module 92 is physically attached to printed circuit elements of the board 91 by a plurality of electrically conductive leads 98, which leads are also electrically connected to the module circuit pads, e.g., the contact pads 84 of FIG. 27 or the pads 79 of FIG. 5.

Assembly Organization

In the preferred embodiment an assembly is defined as a complete, binary addressable unit of store where the number of addressable arrays is an integer power of 2. Each array in the assembly may be assigned a unique binary address in a manner which will become apparent in the ensuing discussion of the circuits of the preferred embodiment of my invention. Physically, the assembly comprises a collection of modules together with the associated bipolar clock and signal drivers and sense amplifiers mounted on a printed circuit board (see FIG. 4).

Matched-Set Organization

Modules in this organization are arranged in sets such that the total number of good arrays is at least equal to the desired assembly address capacity. Each module is utilized, low yield as well as high yield. The individual arrays have no unique address identity before on-line addressing takes place. Initially all good arrays within an assembly form a free space list. Any number of arrays, up to the addressing capacity of the assembly, may each be assigned a unique address during processing operations, by means of inhibit circuitry to be described in detail below. Address uniqueness is obtained by ordering the free arrays in a chain such that each free array is capable of inhibiting all free arrays below it in the chain. The inhibit chain is used only to link together all free arrays in a pool, and it does not participate further in the addressing.

Data associated with a unique address can thus be written into the "top" of the free space list. Once the array at the "top" of the free space list has been assigned an address, it is removed from the list and the free array immediately "below" it becomes the "top" of the list. Any non-free array may be reset into the free state by a special command associated with the unique address of that particular array. The array so reset thereby rejoins the free space list.

Data is read out of a non-free array by addressing the array and simultaneously commanding it to read the contents of its associated memory.

Figure 20:
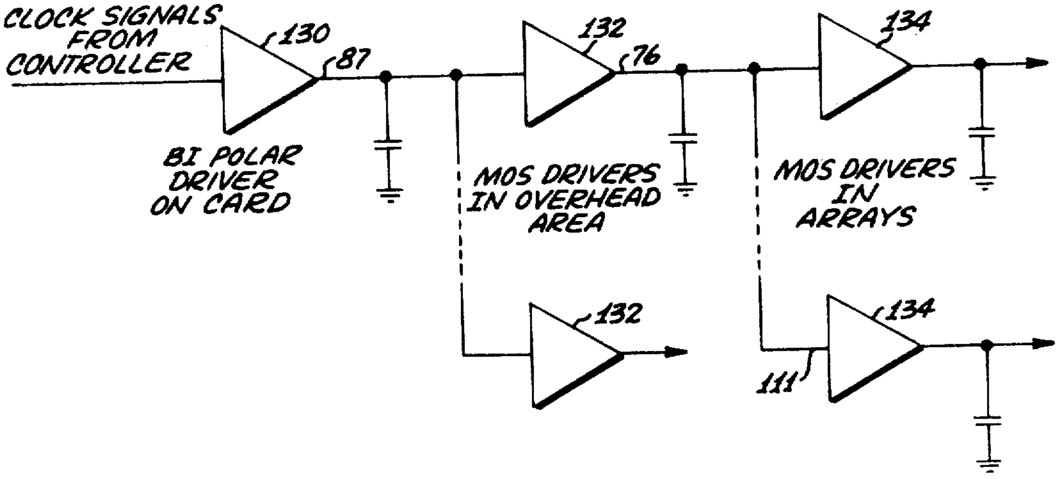
FIG. 20 is a diagram of the clock distribution systems of an assembly.

Referring to FIG. 20, an assembly of 4096 operative arrays comprises module 1 containing 581 operative arrays, module 2 with 985, module 3 with 820, module 4 with 655, and module 5 with 1055. This organization offers the highest utilization of arrays produced, regardless of actual yield. The cost per unit of store is determined at the assembly level rather than at the module level, therefore, short term yield variations brought about by the decrease in the average number of good arrays per module are offset because even low yield modules may be used to form an assembly. As yield increases, the cost per unit of store at the assembly level decreases dramatically without array redesign, since fewer modules are used in an assembly.

Array-General Description

Figure 6:
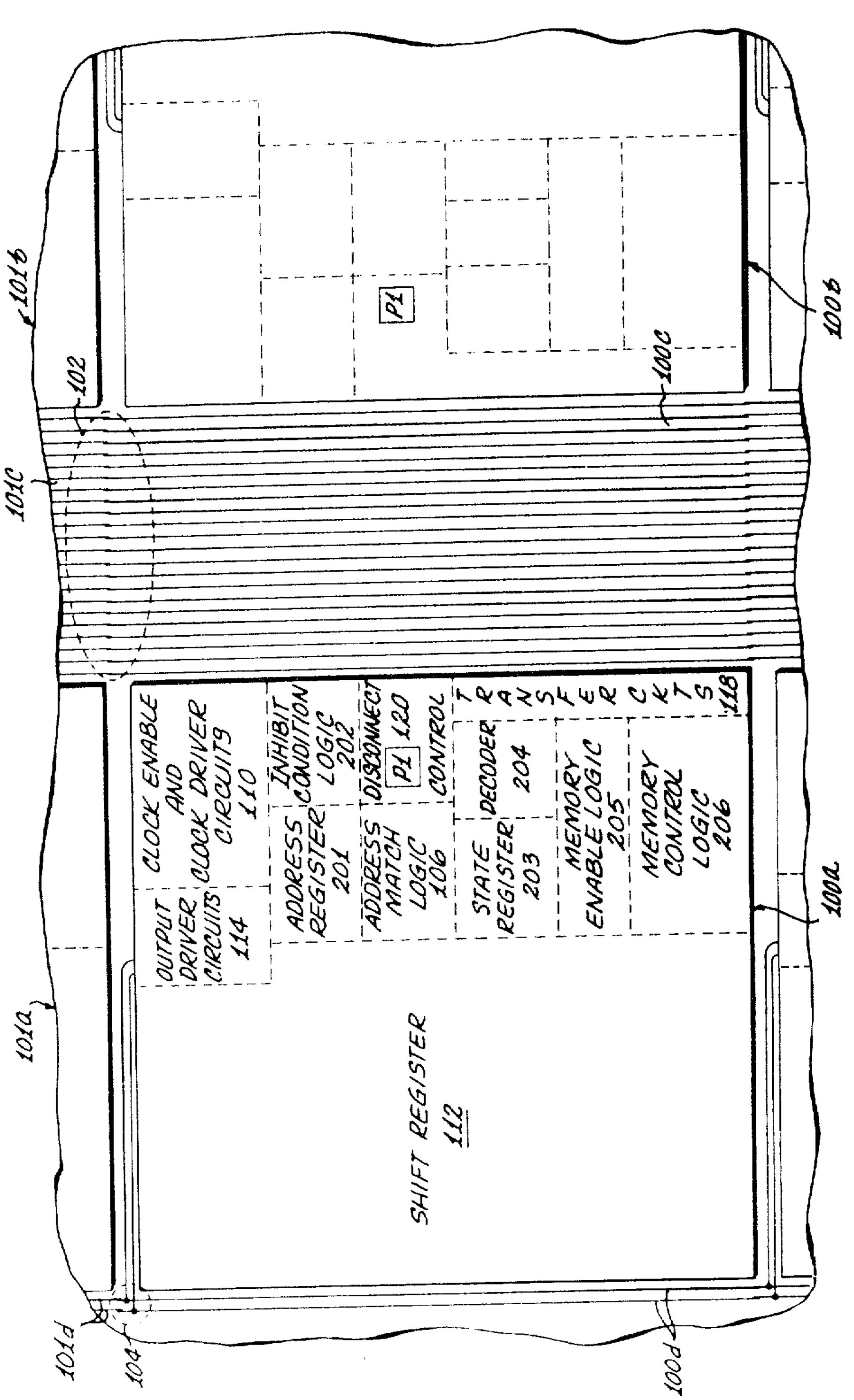
FIG. 6 is a greatly enlarged diagrammatic plan view of a fragment of a wafer showing the layout of a single array.

Referring now to FIG. 6, a diagrammatic plan view of an array pair 100 is shown comprising a left-hand array **100*a* and a right-hand array 100*b*. The latter, shown only in part, is a mirror image of the left-hand array 100*a*. A central input bus portion 100*c* comprising a plurality of input lines services both arrays 100*a*,*b*. An output data bus portion 100*d* on the left side of the left-hand array 100*a* is considered an integral part of the array 100*a*. A portion of another array pair 101 is shown adjacent to the array pair 100. The central bus portions 100*c***,101*c* and the output data bus portions **100*d***, 101*d* are aligned and abut one another, respectively, in areas 102,104 shown circled by dashed lines. The output bus portion **100*d* may also service an array (not shown) adjacent and to the left of array 100*a*. Thus, an input-output bus portion comprising the central input bus portion 100*c* and an output bus portion 100*d*** services two arrays. Collectively, the bus portions form an input-output bus or signal distribution system common to all arrays in the group.

The various circuits comprising the array 100a are delineated by dashed lines in FIG. 6. The relative area occupied on the array 100a is not necessarily depicted, and the optimum layout of the circuits will be apparent to one skilled in the art. The circuits comprise transfer circuits 118 and the associated disconnect control 120, decoder 204, address register 201, address match logic 106, state register 203, inhibit condition logic 202, memory enable logic 205, memory control logic 206, clock enable and clock driver circuits 110, shift register 112, and data output driver circuits 114. Output data is transferred from the driver circuits 114 to the output data bus 100d. Input signals from the bus portion 100c are transferred from the bus 100c to the adjacent circuit areas 110,201,202,106,203,204,206, and 118 via a plurality of leads (not shown) underlying and perpendicular to the leads of the bus 100c.

One embodiment of my invention was fabricated using the silicon-gate process. As an aid to understanding the manner in which an interconnected group is formed from a plurality of identical basic circuits, reference may be made to U.S. patent application Ser. No. 307,317 above, in which the sequence of operations in the fabrication of silicon gate semiconductor integrated circuits of the type disclosed by the present invention is discussed in detail.

Figure 7:
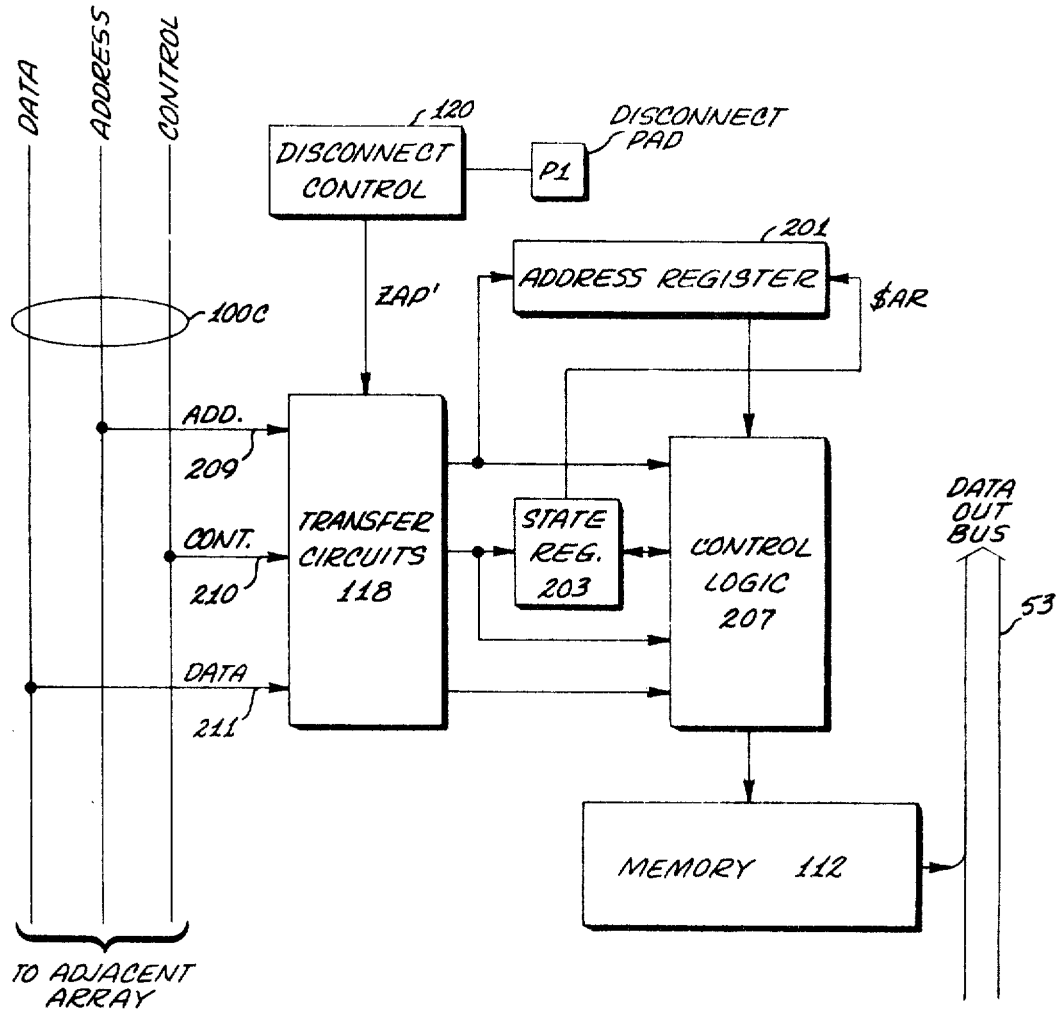
FIG. 7 is a generalized schematic block diagram of an array.

Referring now to FIG. 7, a generalized block diagram of an array is shown. Non-unique central input bus portion 100c has been reduced to three lines for the sake of simplicity, one line carrying input data, one carrying addresses, and one providing control signals. It will be understood that these lines in actuality may comprise a plurality of lines over which signals are transmitted in parallel fashion.

The address, control, and data signals are directed into the array over input lines 209–211 at right angles to the central input bus 100c. Disconnect control 120, including disconnect pad Pl, may be utilized during the testing procedure subsequent to fabrication to disconnect the array from central bus 100c, by application of a ZAP signal to transfer circuits 118, whereby the connection between input lines 209–211 and the interior circuit elements of the array is severed in the event that the array is determined to be defective.

In the case of a normally functioning array, the array is initially in an unused or FREE state prior to its being addressed during data processing operations. State register 203 includes a bistable element (not shown) which is in either one of two states: FREE or FREE'. (The designations A' and $\bar{A}$, representing the inverse of A, are used interchangeably throughout the ensuing description.) State register 203 is responsive to a control signal over control input line 210 to change the state of the array from FREE to FREE'. If INH-IN is defined as the inhibit signal received from a higher order FREE array and SA is defined as a control signal calling for the array to Store Address, then the particular control signal which causes state register 203 to change to the FREE' state is INH-IN'. SA. That is, to change to the FREE' state, the array must not be inhibited by any FREE array higher in the inhibit chain and the array must receive the command to Store Address.

Substantially simultaneously upon changing to the FREE' state, state register 203 transmits an enabling signal $AR to address register 201 allowing it to receive the unique address transmitted over address input line 209. In this way, the array is assigned a unique address within the memory subsystem. Data may then be transmitted over data input line 211 into the memory 112, via control logic 207, by means of a write command over control line 210. When access to the data stored in memory 112 is desired, the array is addressed and simultaneously commanded via control line 210 to read the data out over data output bus 53.

When in the FREE state, the array transmits an inhibit signal to all FREE arrays below it in the inhibit chain. This inhibit signal is dropped as soon as the array changes to the FREE' state, whereby the array next below may be provided with a unique address.

In FIG. 7 the propagation of inhibit signals between arrays is shown to be effected by the control portion of central bus 100c for ease in understanding the invention. As will be shown in greater detail below, separate inhibit lines are utilized in the preferred embodiment to propagate inhibit signals between arrays, and the INH-IN signal is generated within the array itself in response to the signals transmitted over the inhibit lines of central bus 100c.

Array — Detailed Block Diagram Description

Figure 8A:
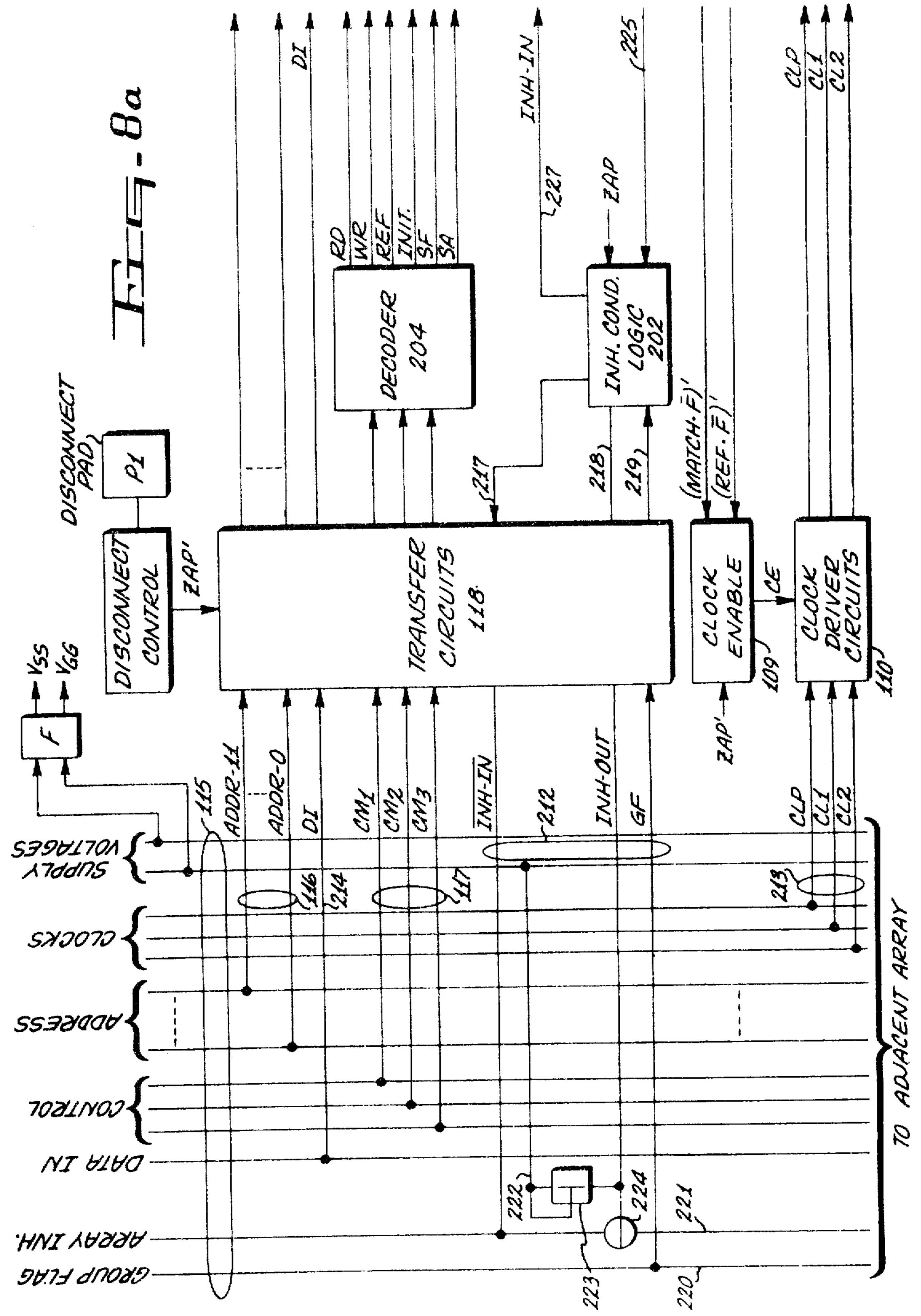
FIGS. 8A and 8B is a detailed schematic block diagram of an array.
Figure 8B:
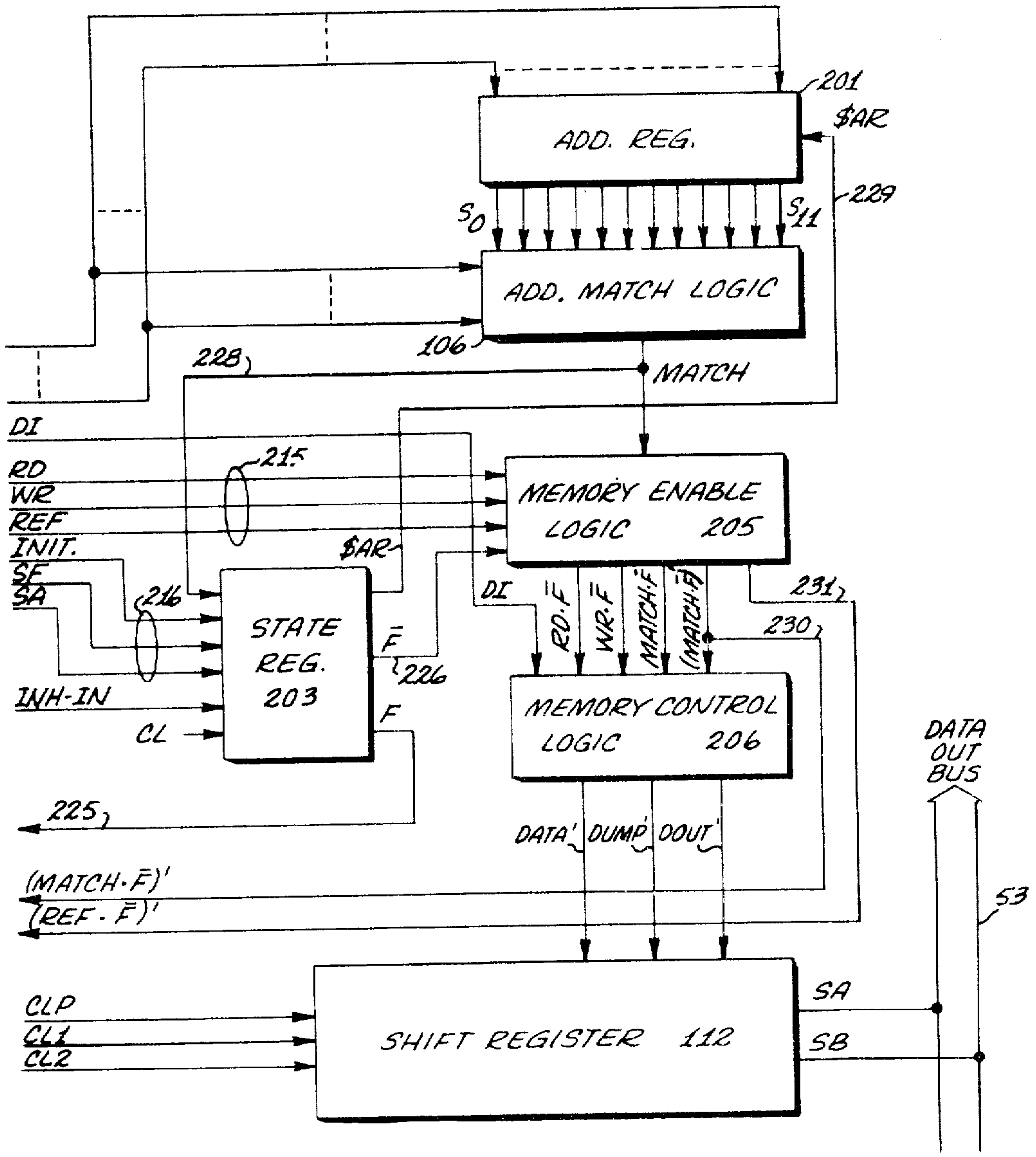

The invention utilizes a large uncut wafer of semiconductor material having many interconnected identical basic circuits completely formed thereon prior to testing. A detailed schematic block diagram of one basic circuit or array is shown in FIG. 8. Each array comprises a two-phase, three-clcock, dynamic shift register 112, an input bus portion 115 and output bus portion 53 having a plurality of interconnection lines which connect to the lines of an adjacent array by overlapping during the step-and-repeat mask making process, a set of disconnection devices or transfer circuits 118 at the bus interface, a disconnect control 120 to control disconnection of the array from the bus 115, an address register 201 for storing a unique assigned address, address match logic 106 for comparing an incoming address with the stored address and generating a MATCH signal when the two coincide, a decoder 204, a state register 203, inhibit condition logic 202, memory enable logic 205, memory control logic 206, clock enable circuit 109, and clock driver circuits 110.

Input signals are transferred to each array via the input bus 115. A plurality of diffused runs 116 connect the ADDRO-11 address signals from the input bus 115 to the address register 201 and to the address match logic 106 via the transfer circuits 118. Diffused runs 117 connect the command signals to the decoder 204, while diffused run 214 connects the DATA IN signal to memory control logic 206, all via transfer circuits 118. Further diffused runs 212 connect the $\overline{\text{INH-IN}}$, INH-OUT, and GROUP FLAG signals to the inhibit condition logic 202 via transfer circuits 118. Diffused runs 213 connect the clock signals CLP, CL1, and CL2 to the clock driver circuits 110.

All arrays are initially (upon fabrication) disconnected from the bus 115, the transfer circuits being disabled by a ZAP signal. During initial wafer testing, operative arrays are connected to the bus 115 by the disconnect control 120. The disconnect control 120 is responsive to a connect voltage applied from an external source such as a multiprobe tester (not shown) to a probe pad P1 to generate and transfer a ZAP' signal to the transfer circuits 118. The ZAP' signal enables the transfer circuits 118, allowing transfer of input signals from the bus 115 to the array, thereby connecting the array. Defective arrays are left disabled by the ZAP signal. Supply voltages $V_{ss}$ and $V_{gg}$ may also be removed from a defective array by means of frangible sectors of the supply voltage runs or other suitable disconnect devices. Details of the transfer circuits 118 and their operation may be found in the above-referenced U.S. application Ser. No. 307,317.

Decoder 204 is a 3×8 decoder of known construction which decodes three-bit binary words received over command lines 117 into six possible commands (two of the eight possible outputs are unused): READ, WRITE, REFRESH, INITIALIZE, SET FREE, and STORE ADDRESS. The first three decoded commands are transmitted over lines 215 to memory enable logic 205, while the remaining three decoded commands are transmitted over lines 216 to state register 203.

Lines 217–219 connect the inhibit condition logic 202 with lines 220 and 221 of central bus 115 relating to the inhibit chain. The inhibit condition logic also receives a FREE signal over line 225 when state register 203 is in the FREE state. When the array is inhibited by FREE arrays above it on the chain, inhibit condition logic 202 transmits an INH-IN signal over line 227 to state register 203. When the higher order inhibit is released, the input to state register 203 switches to INH-IN'.

State register 203 is in the FREE state prior to the addressing of the array. State register 203 can also be set in the FREE condition at any time by either an INITIALIZE command, or by a SET FREE command coinciding with an address MATCH output from address match logic 106 over line 228.

When all higher order arrays have been used and it is desired to store data in the exemplar array depicted in FIG. 8, state register 203 transmits a $AR enabling signal to address register 201, thereby enabling it to store the incoming address signals received over address lines 116. The $AR signal is transmitted by state register 203 under the logical condition: INH-IN'.SA-FREE.CL. That is, the array must be in the FREE state, uninhibited by higher order arrays, and must have received the STORE ADDRESS command coincidentally with the CL clock signal.

Figure 14:
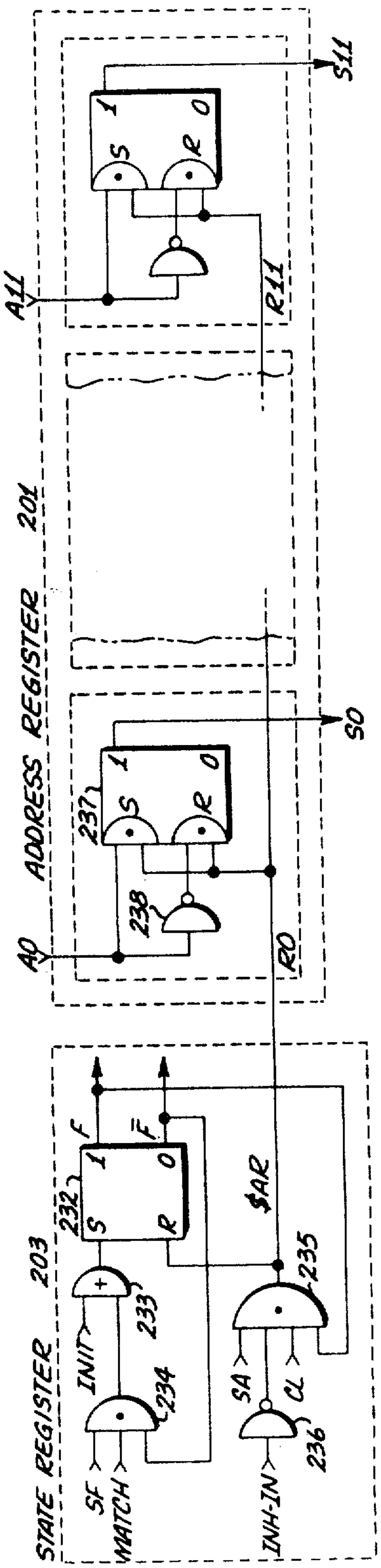

Referring to FIG. 14, state register 203 comprises a J-K flipflop 232, AND gates 234 and 235, OR gate 233, and inverter 236, all of known construction.

Still referring to FIG. 14, address register 201 comprises a number of identical register stages $R_0$–$R_{11}$. Each stage includes a J-K flipflop 237 having AND set and reset input gates. An inverting gate 238 inverts the incoming address signal prior to its input to the reset AND gate. Flipflop 237 of register stage $R_0$ will be set to a logical 1 upon the coincidence of a SAR signal and a logical 1 in address bit position $A_0$. The operation of register stages $R_2$–$R_{11}$ is identical to that of register stage $R_0$. When any register stage $R_0$–$R_{11}$ is set with a logical 1, a logical 1 appears continuously as an output over the corresponding one of output lines $S_0$–$S_{11}$.

During an auxiliary store access of the array depicted in FIG. 8, if the $A_0$–$A_{11}$ address signals match the store signals $SO_0$–$S_{11}$ of the array, a MATCH signal is generated by the address match logic 106 and transferred to the state register 203 and memory enable logic 205. The memory enable logic 205, responsive to either or both a MATCH signal and a FREE' signal, generates control signals which are transmitted to the memory control logic 206 and to the clock enable circuit 109. These signals will be described in detail below with reference to FIGS. 13–18.

The clock enable 109 is responsive to the control signals generated by the memory enable logic 205 to generate a CLOCK ENABLE (CE) signal which in turn enables the clock driver circuits 110 to pass CLOCK-P, CLOCK-1, and CLOCK-2 signals from the input bus 115 to the shift register 112.

The memory control logic is responsive to the control signals generated by the memory enable logic 205 and to the DATA IN (DI) signal during a WRITE operation to gate data (DI) to the shift register 112 for storage. During a READ operation the control logic 109 transfers DUMP' and DOUT' signals to the shift register 112. The shift register 112 is responsive to the DUM' and DOUT' signals to transfer the stored contents of the shift register serially to the data out bus 53 as the SA and SB signals, and concurrently to save the stored data by recirculating the data through the shift register. Data is shifted serially through the shift register 112 under control of the CLP CL1 and CL2 clocks.

Figure 23A:
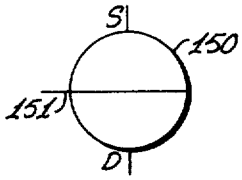
FIGS. 23*a*, *b*, and *c* are schematic symbols used for describing a preferred embodiment of the invention.

The elements of FIG. 8 are shown in detail in the circuit schematics of FIGS. 13–18. Referring first to FIG. 23 (located adjacent FIG. 4), the schematic symbols used herein to depict the circuit elements of the preferred embodiment of my invention are shown. All of theh symbols of FIG. 23 represent conductor-insulator-semiconductor (CIS) field effect devices formed, for example, by the silicon-gate process. FIG. 23*a* depicts a general symbol for a transistor 150 represented by a circle. A gate 151 of the transistor 150 is represented by a line bisecting the circle; and source S and drain D elements are represented by lines perpendicular to the gate 151 and emanating from the circle. The symbol is descriptive of an actual device wherein the gate 151 may comprise a portion of a conductive silicon run overlying the channel between the source S and drain D diffusions.

Figure 23B:
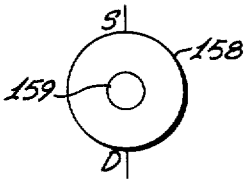

FIG. 23*b* is a symbol representing a specific form of field effect device 158 having a floating gate 159 (i.e., the gate is connected to any voltage or signal source). The gate 159 is therefore surrounded by an insulator, e.g., silicon dioxide which is a dialectric having very low conductivity. The device is normally off (not conducting), and is turned on by avalanche injection of electrons (p-channel) across the oxide barrier. Avalanche is induced by applying a large voltage (40–50V) for about 1 ms between the drain D (or the most negative terminal) and the substrate. In the logic diagrams of FIGS. 13–18 the substrate connections of the devices are not shown. The substrates are, in fact, connected to a point in the circuit which will ensure that the substrate-channel junction is reverse biased. Thus, with p-channel devices the substrate is connected to the most positive of the supply voltages $V_{bb}$. Since the gate 159 is floating, the avalanche injection of electrons results in the accumulation of a negative electron charge on the gate 159. When the applied junction voltage is removed, the charge remains on the gate 159. The negative charge induces a conductive inversion layer in the channel connecting the source S and drain D, turning the device on. Decay of the induced charge due to leakage is negligible during equipment lifetime. The charge may be removed by illuminating the device with ultraviolet light or exposing it to X-ray radiation, thus providing a reprogramming capability.

Figure 23C:
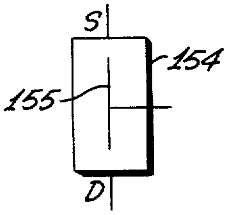

FIG. 23c is a symbol representing a transistor 154 having a gate 155 and source S and drain D terminals. The FIG. 23c transistor is similar to the FIG. 23a device in most respects except that it is used as a non-linear resistor or load in ratioed circuits in which it has the gate and drain D connected together to a constant potential, Vgg. The source S is used as the load point. The channel width of the FIG. 23c device is less and the length is considerably greater than that of the input devices, therefore, the FIG. 23c symbol is given a distinctive shape.

The preferred embodiment of my invention was implemented using p-channel CIS devices. The p-channel transistors are preferred because the process exhibits lower susceptibility to contaminants adversely affecting threshold levels, and other well advantages resulting in lower cost LSIs at the present time. N-channel devices may be used in which case the pulse polarities of the ensuing discussion are reversed. A further convention in the following description assigns a logical 1 to a negative going pulse or a negative level; the assignment is arbitrary.

Figure 15:
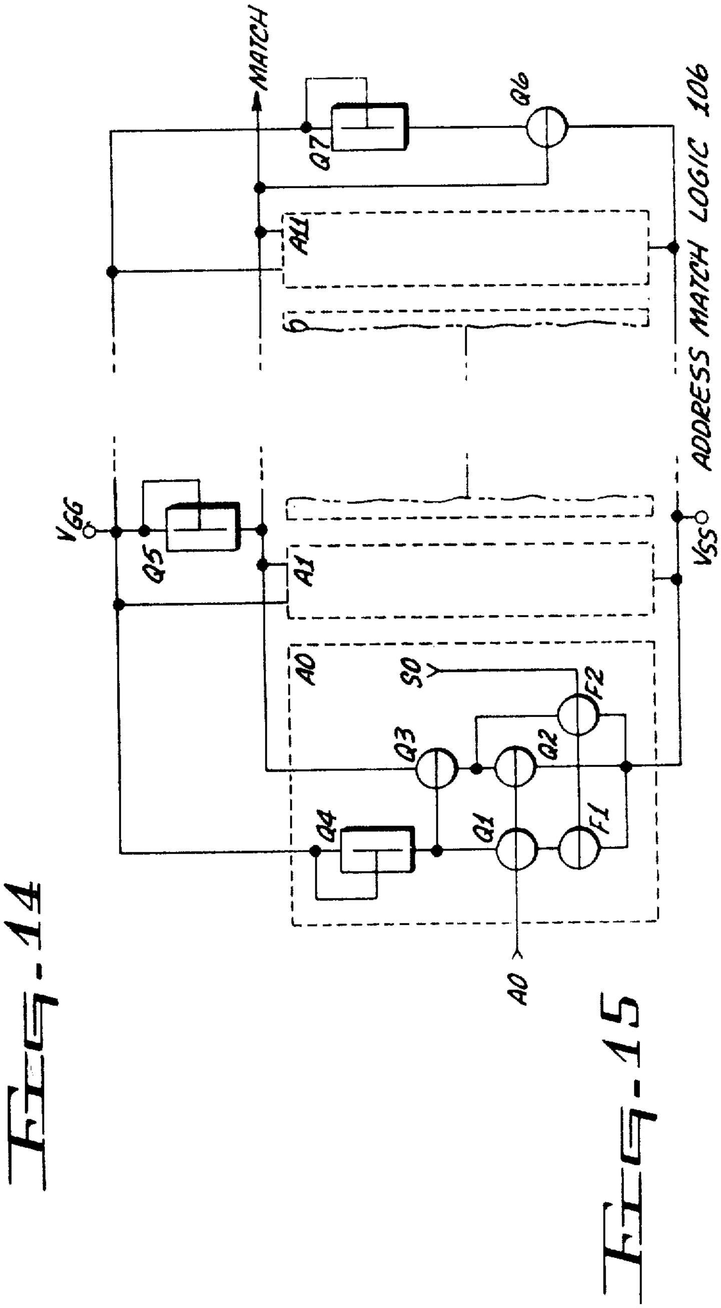

Referring now to FIG. 15, the circuits of the address match logic (106, FIG. 8) are shown in detail. Transistors F1 and F2 are integrated into an exclusive OR circuit including transistors Q1, Q2 and Q3 which performs a comparison function between the AO input and the SO bit stored in register stage $R_0$ of address register 201. The circuit is static ratioed logic employing transistor Q4 connected as a load device and operates as follows. If Q1 and F1 are turned on by logical 1 inputs, Q3 is hold off. If AO and F1,F2 are logical 0 Q3 is enabled but cannot turn on because both Q2 and F2 are off. If Q3 is off in all twelve of the circuits A0–A11, MATCH is a logical 1. Thus, if the incoming address signals A0–A11 compare exactly with the corresponding address bits stored in register stages $R_0$–$R_{11}$ of address register 201, a MATCH signal is generated in the array. A mismatch of any of the incoming address signals A0–A11 with the corresponding stored address bit of register stages $R_0$–$R_{11}$ provides a conduction path via Q3,Q2 or Q3,F2, disabling the MATCH signal. The array address match logic is represented by the following equation.

$$MATCH = (A0 \oplus PO)'(A1 \oplus P1)' \ldots (A11 \oplus P11)'$$

The address match logic circuits are static in order to provide look ahead for the MATCH enable signal prior to application of the clock signals to the dynamic, retioless circuits of the shift register.

Figure 16:
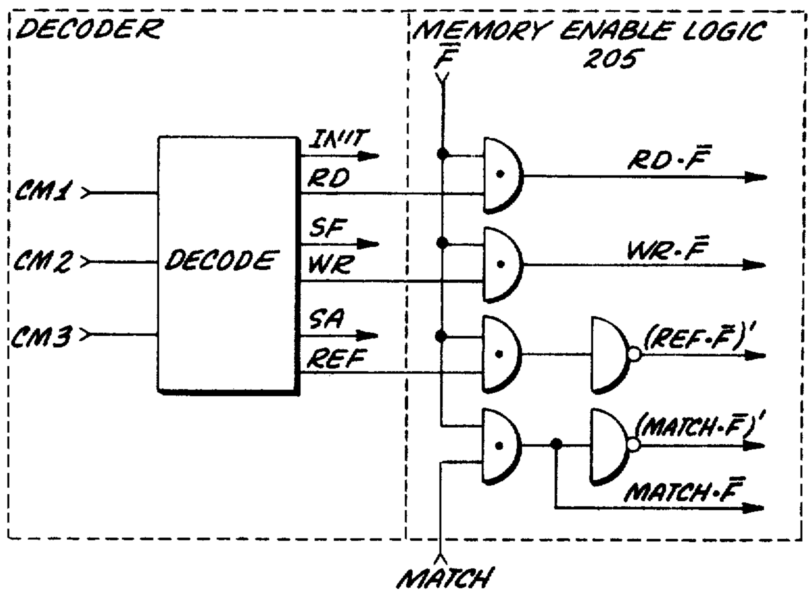

Referring now to FIG. 16, the memory enable logic 205 is shown in detail. Here also, as in the address match logic (FIG. 15), static ratioed logic is used. Five control signals are generated in the memory enable logic 205 by combining the FREE′ signal with READ, WRITE, REFRESH, and MATCH signals, respectively, utilizing conventional AND and inverter gates: RD.$\overline{F}$, WR.$\overline{F}$, (REF.$\overline{F}$)′, (MATCH.$\overline{F}$)′, and MATCH.$\overline{F}$. The RD.$\overline{F}$, WR.$\overline{F}$, (MATCH.$\overline{F}$)′, and MATCH.$\overline{F}$ signals are transmitted to the memory control logic 206. The (MATCH.$\overline{F}$)′ and (REF.$\overline{F}$)′ signals are transmitted over lines 230 and 231, respectively, to the clock enable circuit 109.

Figure 17:
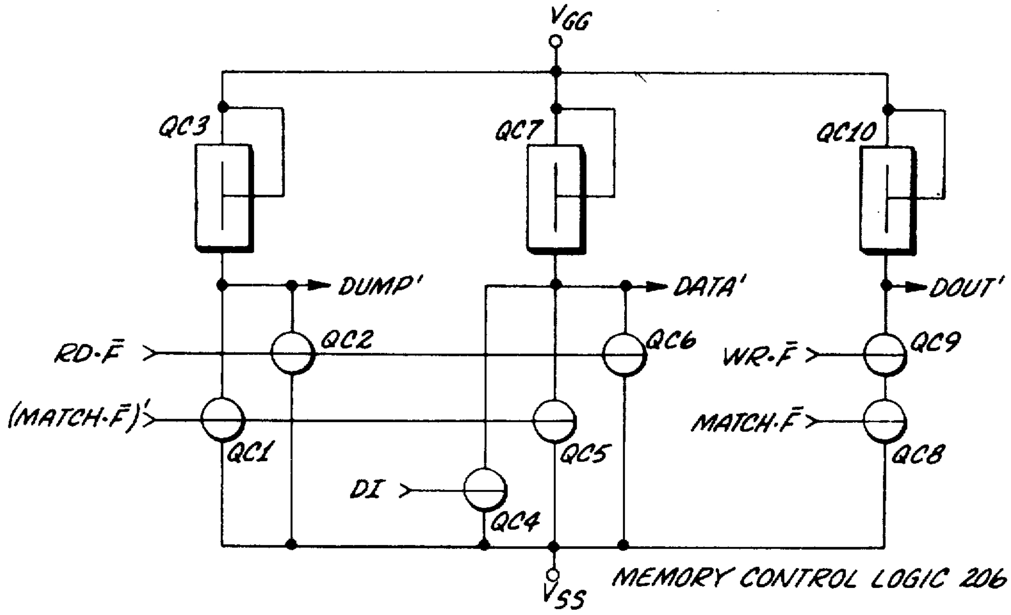

Referring now to FIG. 17, the control logic (108, FIG. 23) is shown in detail. Here also, as in the address match logic (FIG. 25), static ratioed logic is used. Three signals, DUMP′, DATA, and DOUT′ are generated in the control logic in accordance with the following equations:

| | | | |
|---|---|---|---|
| DUMP′ | = | $(MATCH \cdot \overline{F})' + RD \cdot \overline{F}$ | QC1, QC2 |
| DUMP | = | $(MATCH \cdot \overline{F})(RD \cdot \overline{F})'$ | |
| DATA′ | = | $RD \cdot \overline{F} + (MATCH \cdot \overline{F})' + DI$ | QC4, QC5, QC6 |
| DATA | = | $(RD \cdot \overline{F})' \cdot (MATCH \cdot \overline{F}) \cdot DI'$ | |
| DOUT′ | = | $(WR \cdot \overline{F})(MATCH \cdot \overline{F})$ | QC8, QC9 |
| DOUT | = | $(WR \cdot \overline{F})' + (MATCH \cdot \overline{F})'$ | |

Thus, for an enabled array in the FREE′ state (MATCH.$\overline{F}$), during a read operation (RD.$\overline{F}$) the DUMP′, DATA′, and DOUT signals are enabled. During a valid write operation (WR.$\overline{F}$), the DOUT′ and DUMP signals are enabled and the DATA′ signal follows DI. (The input data is inverted, i.e., when the DI signal is logical 0, the DATA′ signal is logical 1). The significance of the control logic signals is described later with reference to the shift register and output driver operation.

Figure 13:
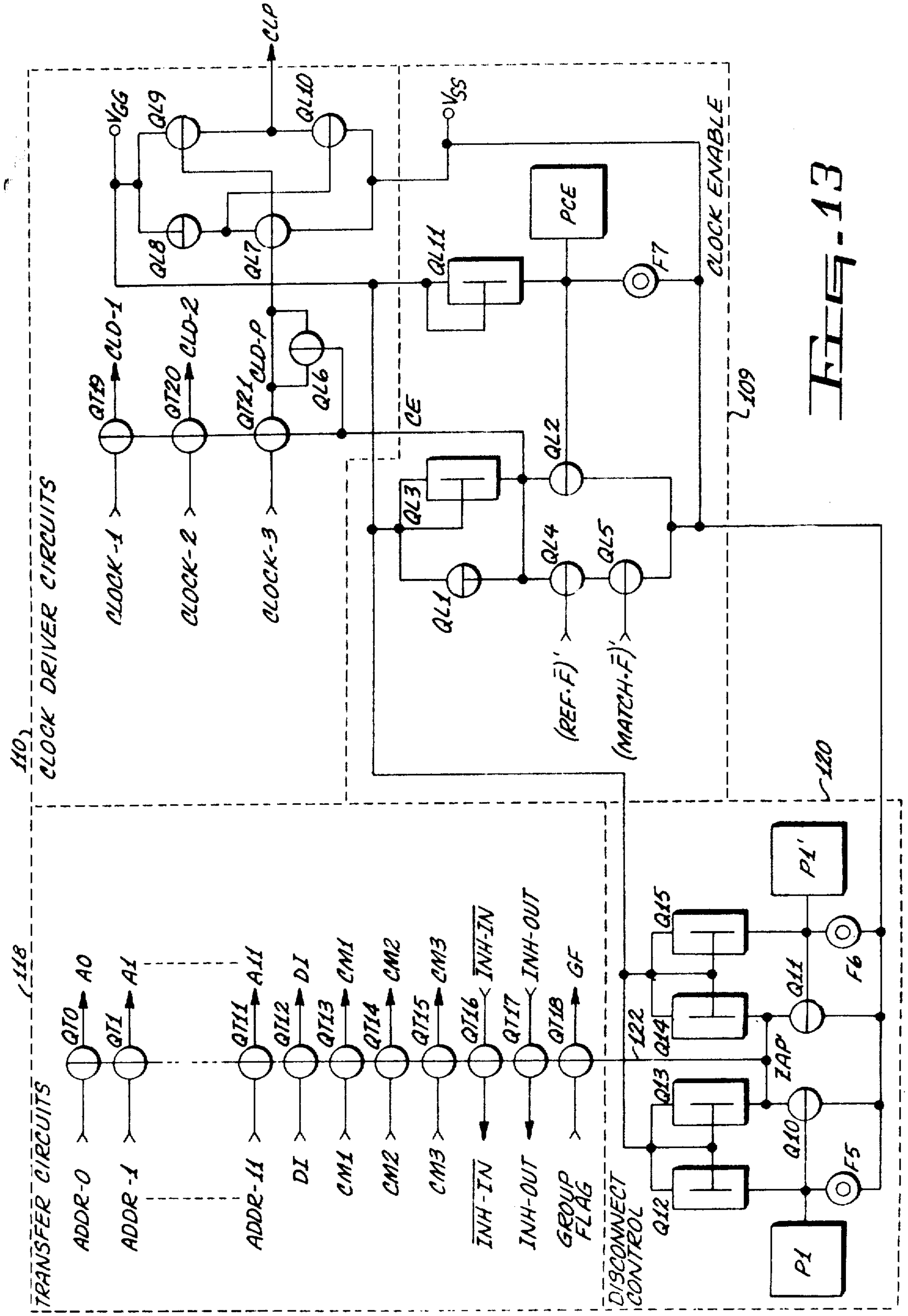
FIGS. 13–18 are detailed schematic diagrams of the circuits of FIG. 8.

Details of the disconnect control 120 (see FIG. 8) and the transfer circuits 118 are shown on the left-hand side of FIG. 13. A dual disconnect circuit comprising transistors F5,F6 and Q10-Q15 is shown. Probe pads P1 and P1′ are connected, respectively, to the drains of floating gate devices F5 and F6. Although a dual disconnect circuit is shown, the operation of only one of the identical is described. F5 is normally off (i.e., no charge on the gate), when the array is tested after wafer manufacture. With F5 off, Vgg potential (less the drop through load device Q12) is applied to the gate of Q10. Q10 conducts enabling a ZAP signal level (logical 0) on the drain of Q10. The Q10 drain is connected to a polysilicon run 122, which forms the gates of switching transistors QT0-QT18. The ZAP signal disables QT0-QT14 preventing the transfer of input signals from the bus to the array through the transfer circuits. During array testing, Vss potential is temporarily applied via probe pad P1 to the gate of Q10 turning Q10 off and applying Vgg potential less the load Q13 drop (ZAP′ enable signal) to the gates of QT0–QT18. With the transfer circuits QT0–QT18 enabled the array address match logic 106 (FIG. 15) will respond to an all "zero" (Vss potential) address on the ADDRO-11 address lines, and data (DATA IN, QT12) can be written, read back, and compared to test the array, provided that the array is responsive to the appropriate command signals input over lines 117, and provided that the inhibit chain is temporarily disabled to permit testing of a single array.

Upon determining the array good, an avalanche charge is applied to the pad P1, injecting electrons onto the floating gate of transistor F5, turning it on. Q10 is turned off by F5 conducting and a semipermanent ZAP′ enable signal level is applied to the gates of transfer transistors QT0–QT18.

Referring still to FIG. 13, a separate clock-enable disconnect circuit comprising floating gate transistor F7, avalanche pad PCE, and load transistor QL11 is shown. As with the previously described didsconnect control circuit, F7 conducting (i.e., electrons injected onto the gate of F7) turns QL2 off, applying a CE clock enable level to the gates of QT19–QT21. The clock-enable disconnect circuit F7,PCE,Q11 is redundant, as is the alternate disconnect control F6,$P12_1$,Q15. Both of the redundant circuits may be eliminated (as in FIG. 8) by deleting the redundant circuit elements and connecting the gate of Q10 (ZAP) directly to the gate of QL2. The purpose of the redundant disconnect circuits is to minimize the probability of critical failure whereby the transfer circuits QT0–QT21 cannot be turned off. Transistors Q10 and Q11 control the permanent disconnection of transistors QT0–QT18 (and in addition the disconnection of clock-transfer transistors QT19–QT21 upon elimination of the redundant clock enable disconnect circuit). The transfer transistors QT0–QT21 are rendered inoperative to disconnect the array from the bus only if both Q10 and Q11 fail, e.g., due to a gate-to-substrate short. Correct operation of certain circuits thus is mandatory to prevent a failure in one array from causing failure of an entire group. If there should then be a gate to substrate short in an array transistor, e.g., QL4 of the clock enable circuit or QL17 of the clock driver circuits, a bus short is prevented by turning off the array transfer circuits. If one of the transfer transistors QT0–QT21 fails due to a shorted gate, it will automatically be off and the group remains operative. The only transfer transistor failure mode which can cause bus shorts is a short from gate to source; however, the probability of this failure mode is low because of the minimal gate-to-source/drain overlap area associated with the silicon-gate process.

Still referring to FIG. 13, the transfer transistors QT19–QT21 of the clock driver circuits are enabled by the CE clock-enable signal if the array is good (i.e., PCE on, QL2 off) and both QL4 and QL5 are off.

CE = PCE (MATCH + REF)

CE' = PCE' + (MATCH' REF')

Thus, the CLD-1,2,P clock signals are enabled, respectively, through transfer transistors QT19–21 if an array is good (QL2 off) and the MATCH signal is generated in response to an identity between the incoming address signals A0–A11 and the unique address of the array stored in the address register 201. The clocks are generated for a complete array cycle, i.e., a sufficient number of clocks to fill the shift register with new data during a read operation or to read out the entire stored contents during a write operation. Partial cycles could of course be performed, however, data block positioning information must then be maintained by the management control subsystem or by additional logic implemented in the auxiliary store or controller.

During any valid data cycle, read or write, only one array in each assembly is operating at maximum system frequency, all others are ordinarily dormant. The signal levels stored in the capacitive elements of the preferred embodiment of the shift register described hereinafter require periodic refreshing or regeneration to prevent dissipation or leakage of the stored charges. Accordingly, a REFRESH signal is provided which enables the CE signal simultaneously for all arrays in the assembly, on a periodic basis (e.g., every 2 ms in the preferred embodiment). The (MATCH.$\bar{F}$)' signal (FIG. 17) prevents generation of the DUMP, DATA and DOUT control signals. Data thus is circulated (neither read nor written) in each array. One array in the assembly being refreshed may sense an address match condition, in which case data is read or written normally for that array.

The CLD-1,2,P clock signals are each transferred to a separate clock driver, only one of which (the CLD-P circuit) is shown in FIG. 13. The exemplary clock driver comprises input transistors QL7 and QL9, the latter operating push-pull with QL10. The clock drivers, operating in push-pull mode, draw DC power only for the duration of the clock pulse. Standby power (clocks off), therefore, is negligible and due only to leakage current. A transistor QL8 is connected gate-to-source to provide a non-linear load resistance. The input to QL7 and QL9 is bootstrapped by transistor QL6 connected (source to drain) as a voltage-dependent capacitor to improve the clock signal amplitudes. QL6 charges to approximately $V_{gg}$ potential (less the threshold drop) through QL3 when no clock pulse is present at the source of QT21. When CLOCK-P is applied to QT21, the stored charge boosts the amplitude of the CLD-P input to QL7. A protective device QL1, connected as a reverse diode provides a discharge path to Vgg. An equivalent circuit for the clock drivers of a typical assembly is shown in FIG. 20. To reduce bipolar driver 130 requirements, CIS or MOS drivers 132 in the group overhead areas (see FIGS. 5,27) are utilized.

Figure 18:
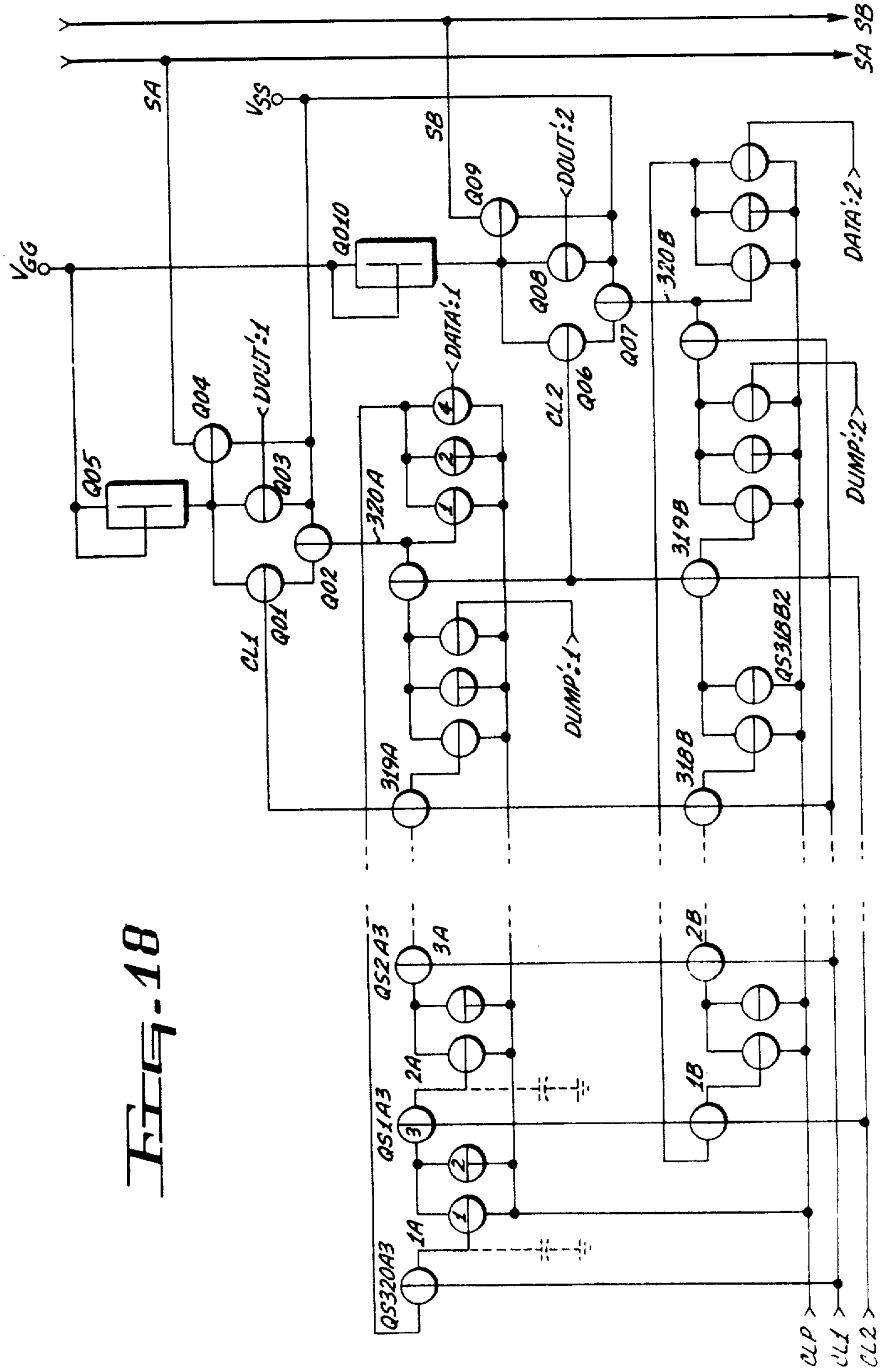
Figure 19:
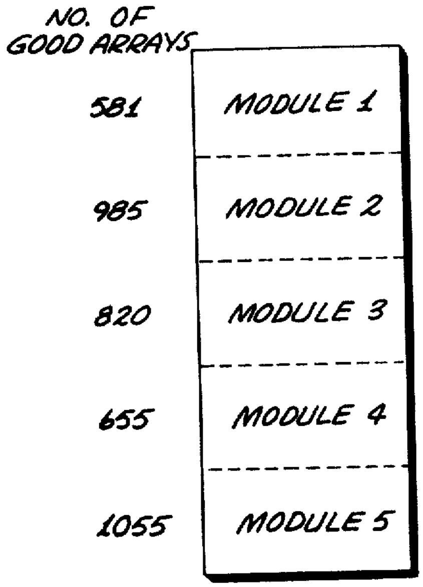
FIG. 19 is a diagram of an assembly organized with a matched set of modules.

Referring now to FIG. 18, the shift register (112, FIGS. 6–8) and the output driver circuits (114, FIG. 6) are shown in detail. The shift register of FIG. 18 employs two-phase, three clock, dynamic ratioless logic in a multiplexed dual-bank 320-bit register, 160 bits of storage per bank. The two banks are evident in the layout of FIG. 18, one bank bearing literal designations of reference A; the other, B. Only representative ones of the shift register transistors are shown and labelled on FIG. 18. For example, transistor QS1A3 (labelled with a small 3 inside the symbol) is to the right of and connected to QS1A2 and QS1A1. Storage nodes consist of the parasitic capacitances of the runs interconnecting the transistors. Two representative storage nodes labelled 1A and 2A are shown as phantom capacitors with dashed lines. One bit of storage requires six transistors in two stages, a storage stage and an inverter stage, as for example, storage stage 1A comprising transistors QS1A1–QS1A3 and inverter stage 2A comprising transi stors QS2A1–QS2A3.

Figure 24:
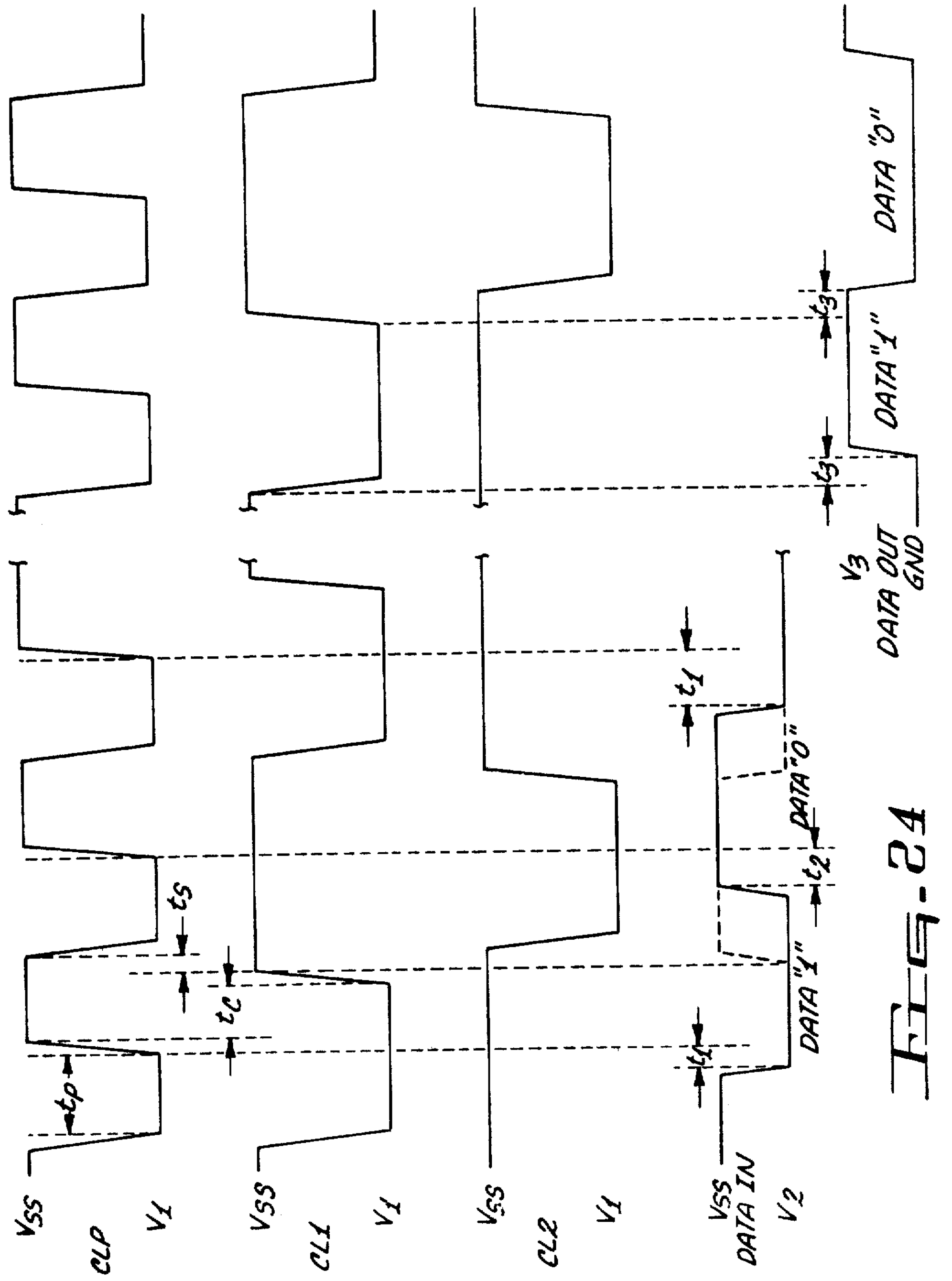
FIG. 24 is a timing diagram depicting the operation of an array.

A timing diagram for the shift register of FIG. 18 is shown in FIG. 24. P-channel devices are utilized in the description of the preferred embodiment; it is understood that n-channel circuits may be used in which case the polarities of FIG. 24 would be reversed and the timing restraints loosened due to the inherently faster speed of n-channel majority carriers. The timing diagram of FIG. 24 represents the internal data transfer operations of shift register 112 for the case where the associated array is in the FREE' state.

For details of the operation of shift register 112 reference may be had to the aforementioned U.S. patent application Ser. No. 307,317, wherein the operation of the shift register disclosed is identical to that in the present invention.

Figure 21:
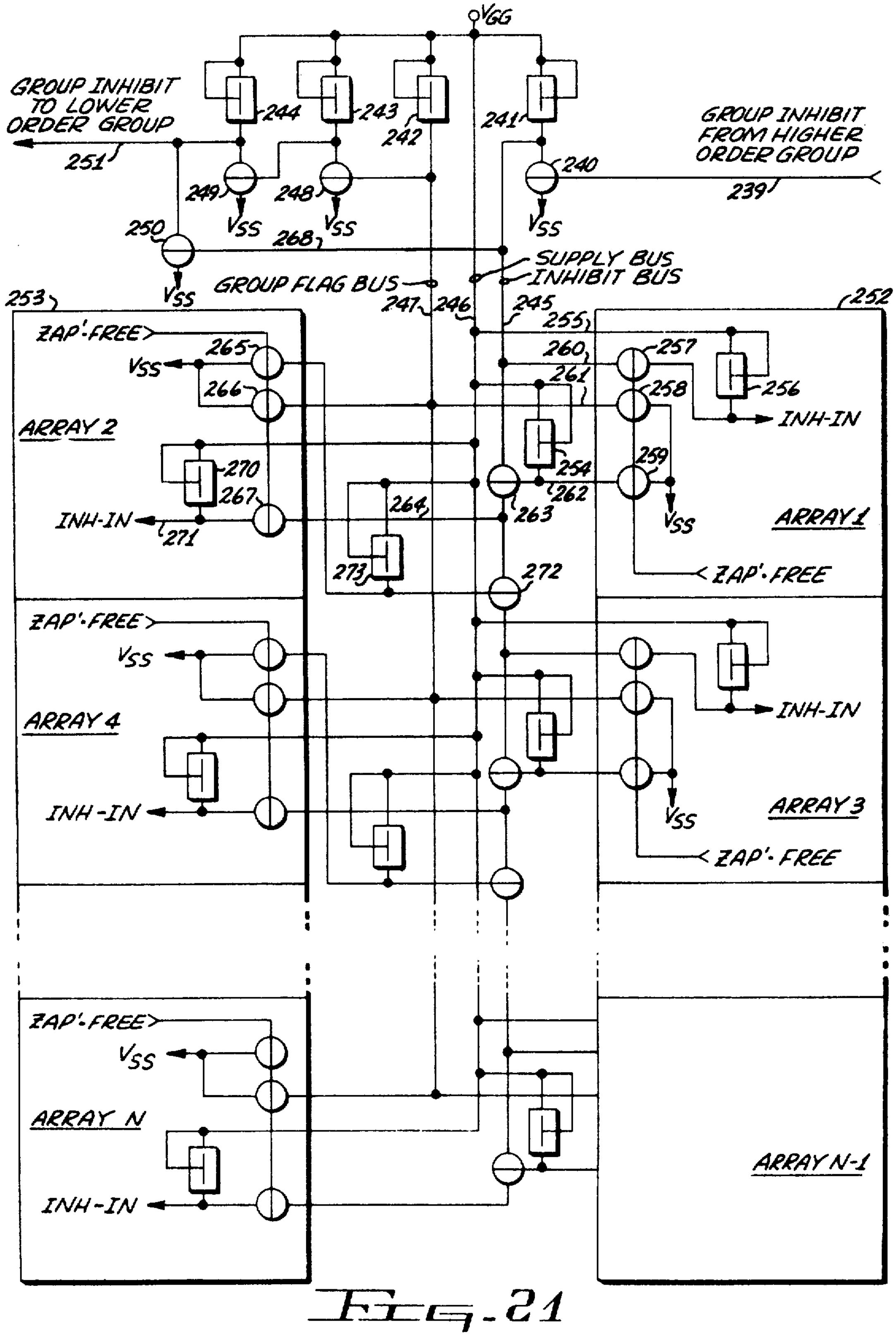
FIG. 21 is a detailed schematic diagram of an inhibit circuit interconnecting several arrays.

Referring now to FIG. 21, a preferred embodiment of the inhibit chain logic, including the inhibit condition logic 202 (FIG. 8) of each array, is shown in schematic form. Assume initially that the N arrays shown in FIG. 21 are all in the FREE state and that an inhibit signal is being transmitted to the group of N arrays over line 239 from the next higher order group. According to the logic used in the FIG. 21 schematic, a 0 voltage on line 239 represents an inhibit condition in the inhibit chain above the depicted group of N arrays, whila a −1 voltage on line 239 represents a non-inhibit condition, in which all higher order arrays are in the FREE' state.

Transistor 240 is nonconductive when a 0, indicating an inhibit condition, is transmitted over line 239 from a higher order group. When transistor 240 is nonconductive, transistor 241 generates a 1 over line 268, turning transistor 250 on, and opening a conductive path to Vss for transistor 244. Thus, regardless of the state of any of the N arrays, a 0 is transmitted over line 251 to the next lower group. When a 1, indicating a non-inhibit condition, is transmitted over line 239 from a higher order group, transistor 240 becomes conductive and transistor 250 becomes nonconductive. Whether a 0 or a 1 is transmitted over line 251 to the next lower group is dependent upon the state of arrays 1 through N of the group shown in FIG. 21, as will now be shown.

When transistor 240 is conductive, because of a 1 transmitted over line 239, transistor 256 of array 1 generates either a 1, representing an INH-IN signal, over line segment 269, or else a 1 through transistor 257, over lines 260 and 245, through transistor 240 to V*ss*, depending upon whether transistor gate 257 is off or on, respectively. As seen in FIG. 21, transistor 257, together with transistors 258 and 259, becomes conductive only when array 1 is both FREE and operative (i.e. ZAP' condition). Thus when array 1 is both an operative array and FREE, the INH-IN signal is dropped on line 269, and the array may be set in the FREE' state by application of a STORE ADDRESS signal over command lines 117 (FIGS. 8 and 14). While the INH-IN is down in array 1 and before array 1 is set in the FREE' state, all other arrays in the group are kept inhibited. Transistor 254 conducts through transistor gate 259, causing transistor gate 263 to remain off. No other load transistor in the arrays lower in the chain, such as transistor 270 of array 2, can conduct through the inhibit bus 245 to Vss. When array 1 is set into the FREE' state, gates 257–259 are turned off, gate 263 becomes conductive, and the INH-IN signal on line segment 271 of array 2 is dropped, assuming array 2 is both operative and FREE. Array 2 may now store an address and be set in the FREE' state, making transistor gate 272 conductive. The other arrays 3 through N are similarly addressed one-by-one in succession, until all have been switched to the FREE' state. When all N arrays are in the FREE' state, load transistor 242 no longer has a conductive path to Vss over the group flag bus 247 through gates such as 258 or 266 enabled by the ZAP'. FREE condition. Thus gate 248 is turned on, load transistor 243 conducts to V*ss*, transistor 249 is turned off, and load transistor 244 conducts a 1, representing a non-inhibit condition, over line 251 to the next lower order group of arrays. At this conjuncture, all N arrays, as well as all arrays in the chain above, are either FREE' or in the disconnected state.

Assume now that during the addressing of the depicted N arrays it is desired to SET FREE array 1 and to assign it a new address. Upon receipt of the SET FREE command, array 1 assumes the FREE state (see FIG. 14), gates 257–259 become conductive, the INH-IN signal is dropped on line segment 269 of array 1, and gate 263 of inhibit bus is shut off, preventing any arrays lower in the chain from responding to the STORE ADDRESS signal. When array 1 has reassumed the FREE' state, gate 263 again becomes conductive, and the next lower FREE array in the chain may be assigned an address.

The load transistors exemplified by 254 and 273 and gate transistors 263 and 272 are located within the central bus portion 115 (FIG. 8) in the preferred embodiment; however, they may be situated within the array itself if so desired.

Figure 22:
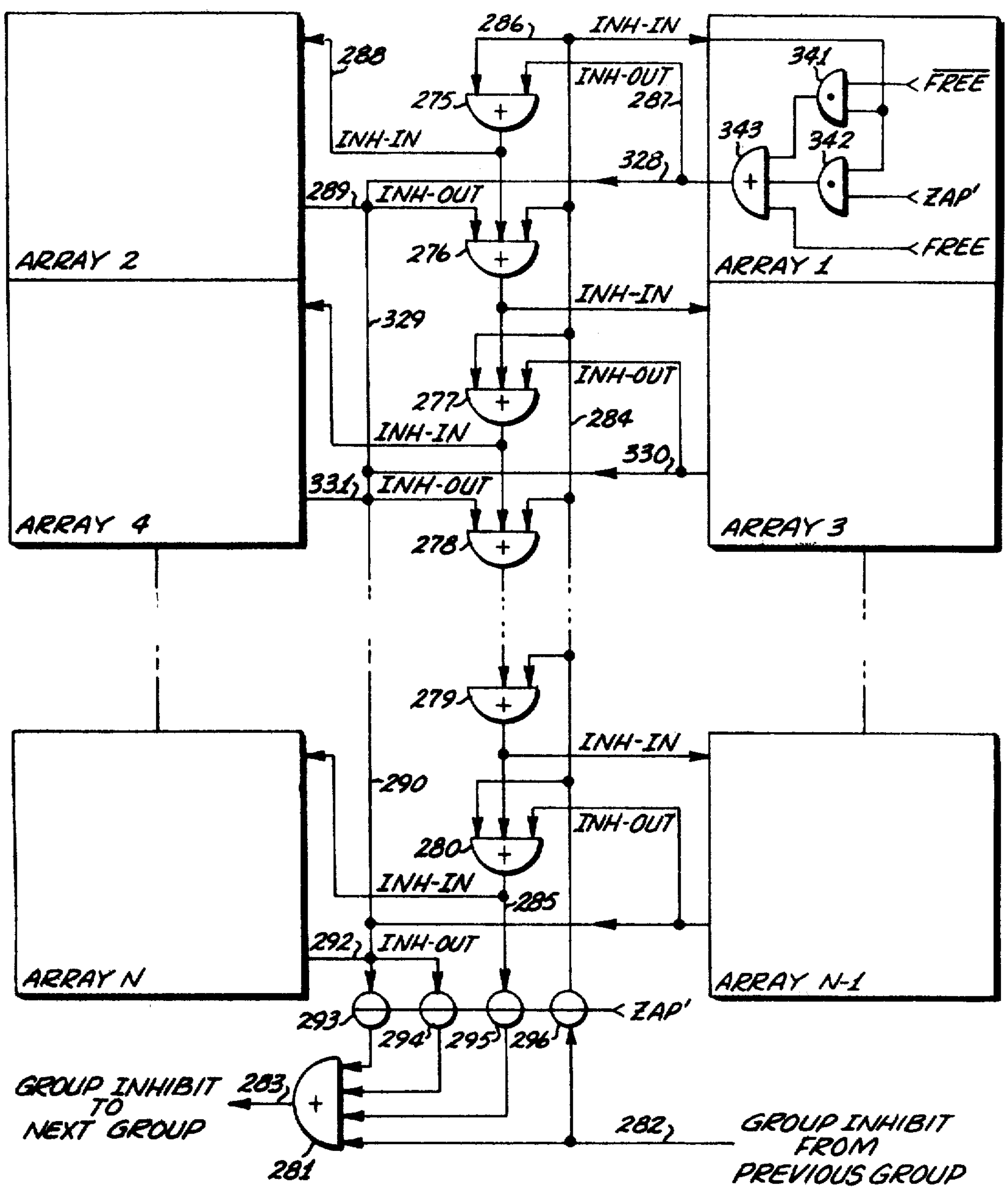
FIG. 22 is a schematic diagram of an alternative embodiment of an inhibit circuit interconnecting several arrays.

FIG. 22 illustrates an alternative embodiment of the inhibit chain. Assume that the logic convention is now such that a 0 over any line represents the absence of an inhibit condition and that a 1 represents an inhibit condition. Thus a 1 transmitted over line 282 from the next higher order group indicates that at least one array in such group is FREE. The 1 over line 282 is propagated through OR gate 281 and over line 283 to the next lower order group. The 1 over line 282 is also carried to every OR gate 275–280 of the central bus portion by line 284, thereby conveying a logical 1, representing an inhibit signal, to each array 1 through N over the INH-IN lines.

When a 0, representing a non-inhibit condition, is transmitted over line 282, the INH-IN signal over line 286 to array 1 is dropped to a 0, permitting this array to store an address, provided that the array is FREE. A logic network comprising AND gates 341 and 342 and OR gate 343 is responsive to FREE or FREE' signals output by state register 203 (FIG. 8), and to the ZAP' signal, and to the INH-IN signal transmitted over line 286. This logic network generates a 1 over INH-OUT line 287 according to the logical equation: FREE + FREE'.INH-IN + ZAP'.INH-IN. The logic network is shown only for array 1 and is depicted greatly enlarged relative the array size for ease of viewing.

The 1 over INH-OUT line 287 is maintained until array 1 is set in the FREE' state, whereupon the INH-OUT line drops to a 0. When the INH-OUT line 287 and group inhibit line 284 are both 0, a 0 is transmitted over INH-IN line 288 to array 2, allowing this array to store an address. When finally array N has been set to the FREE' state, the INH-OUT line 292 from array N drops to 0, and OR gate 281 generates a logical 0, representing a non-inhibit condition, which is transmitted over line 283 to the next lower order group of arrays.

Group flag line 329 connects the INH-OUT line of each array with OR gate 281 via transfer gate 293. It is used to speed the propagation of an inhibit signal along the inhibit chain and reduce settling time in the OR gates 275–280 in the central bus portion. A logical 1 is transmitted over the INH-OUT lines to the group flag line 329 and directly to OR gate 281 so long as any array remains in the FREE state.

Gates 293–296 represent a disconnect means for disabling the entire group shown in FIG. 22 upon application of a ZAP signal.

Figure 11:
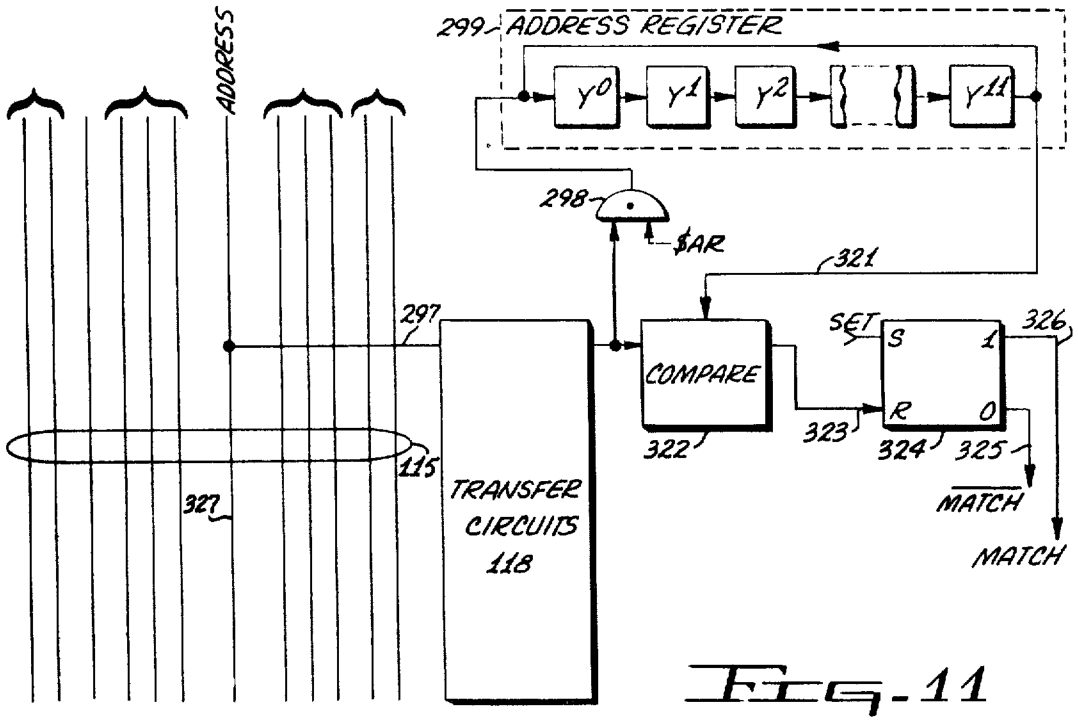
FIG. 11 is a schematic block diagram of an alternative embodiment of an array.

Reference will now be had to FIG. 11, showing an alternative embodiment of an array for carrying out the present invention, in which serial addressing of the array rather than parallel addressing is employed. FIG. 11 depicts only those portions of the array circuitry which differ from those shown in the FIG. 8 embodiment, all other circuit details remaining the same.

A signal group address line 327 in central bus portion 115 carries address signals to every array of the group. Address line 297 transmits address signals off of group address line 327 and through transfer circuits 118 of identical construction as those described with reference to FIG. 8. Address signals are serially gated into address register 299, which comprises a 12-bit recirculating shift register, when AND gate 298 is enabled by the $AR signal from state register 203 (FIG. 8).

When the array illustrated in FIG. 11 is accessed subsequent to the initial addressing operation, address match logic circuitry comprising comparison means 322 and flipflop 324 are used to generate either a MATCH or MATCH' signal indicating identity or non-identity, respectively, of the incoming address signals with the stored address. Flipflop 324 is set to output a MATCH signal by a set signal transmitted over a line (not shown) within the central bus portion 115. Flipflop 324 is reset, and outputs a MATCH' signal, whenever compare means 322 indicates a lack of identity between the incoming address and the stored address by transmitting a reset signal over line 323 to the reset input of flipflop 324. Compare means 322 compares the incoming address bit-by-bit with the corresponding address which is output over line 321 from the recirculating shift register 299. If flipflop 324 is still in the MATCH state after all incoming address bits have been compared, the MATCH signal transmitted over line 326 is utilized by the memory enable logic 205 (FIG. 8) for eventual control of shift register 112 (FIG. 8) as described hereinabove.

The set signal is applied to flipflop 324 prior to the READ, WRITE, and REFRESH commands. It is not applied prior to the INITIALIZE command. It is immaterial whether it is applied prior to the STORE ADDRESS or SET FREE commands.

It will be apparent to those skilled in the art that the disclosed semiconductor mass store may be modified in numerous ways and may assume many embodiments other than the preferred form specifically set out and described above. For example, the shift register may be implemented with charge-transfer dynamic devices thereby greatly reducing the array size and increasing circuit speed. The preferred devices utilized for disconnect control and address programming are electrically reprogrammable elements. Other forms of programmable elements such as fusible link devices may be utilized. Finally, other types of electrically reprogrammable elements such as metal alumina oxide semiconductor (MAOS) and MNOS devices may be used as well. Accordingly, it is intended by the appended claims to cover all modifications of the invention which fall within the true spirit and scope of the invention.

What is claimed is:

1. An integrated-circuit store having connected thereto from an external source means for transmitting an address signal, means for transmitting a data signal, and means for transmitting at least one control signal and adapted to receive address and control signals from said external source and to transfer data signals to and from said external source, said store comprising a body of semiconductor material, a plurality of basic circuits formed on said body of semiconductor material as a common substrate, and means for connecting said transmitting means to at least one of said plurality of basic circuits, each one of said basic circuits comprising:

a bus portion including at least one address signal line, a data signal line, and a plurality of control signal lines, said bus portion interconnecting said plurality of basic circuits;

first means for storing said data signals;

second means for storing an address;

third means for storing at least one status signal;

means responsive to said third storage means for selectively enabling said second storage means to store a unique address transmitted over said address signal line;

fourth means for selectively inhibiting the operation of said enabling means, said fourth means being responsive to the contents of said third means and to an inhibit control signal transmitted over a predetermined one of said control signal lines;

fifth means, associated with said predetermined control signal line, for ordering said one basic circuit relative to the other basic circuits of said integrated-circuit store, said fifth means being responsive to the contents of all of said third means of the basic circuits of higher order than said one basic circuit to selectively generate said inhibit control signal over said predetermined control signal line to the basic circuits of lower order;

means for controlling the transfer of dtat signals between said data signal line and said first storage means;

means responsive to a comparison between address signals received over said at least one address signal line and said stored address for actuating said controlling means;

second means for connecting said at least one address signal line to said actuating means, for connecting said data signal line to said first storage means, and for connecting said control signal lines to said third storage means; and means for disabling said second connecting means, thereby disconnecting said one basic circuit from said signal bus.

2. An integrated-circuit store according to claim 1 wherein said disabling means comprises a semipermanent voltage-programmable transistor.

3. An integrated-circuit store having applied thereto from a controller a plurality of address and control signals and connected to an external data line and adapted to transfer data signals to and from said external data line, said store comprising a body of semiconductor material, a plurality of basic circuits formed on said body of semiconductor material as a common substrate, and a first means for connecting said data line and said applied signals to at least one of said plurality of basic circuits, each one of said basic circuits comprising:

a bus portion including a plurality of address and control signal lines and a data signal line, said bus portion abutting a like adjacent bus portion to form therewith a signal bus interconnecting said plurality of basic circuits;

switching means;

first means for storing said data signals;

second means for storing an address;

third means for storing a status signal, said third means including enabling means responsive to said status signal for selectively enabling said second storage means to store a unique address transmitted over said address signal lines;

fourth means for selectively inhibiting the operation of said enabling means, said fourth means being responsive to the contents of said third means and to an inhibit control signal transmitted over a predetermined one of said control signal lines;

fifth means, associated with said predetermined control signal line, for ordering said one basic circuit relative to the other basic circuits of said integrated-circuit store, said fifth means being responsive to the contents of all of said third means of the basic circuits of higher order than said one basic circuit to selectively generate said inhibit control signal over said predetermined control signal line to the basic circuits of lower order;

means for comparing said address signals with the contents of said second storage means, said comparing means being responsive to a coincidence between said address signals and said unique stored address to generate a control enable signal;

means connected to said first storage means and responsive to said control enable signal to control the transfer of said data signals between said data signal line and said first storage means;

second means for connecting via said switching means said address signals to said comparing means, said control signals to said fourth and fifth means, and said data signal line to said first storage means; and means for disabling said switching means, thereby disconnecting said one basic circuit from said signal bus.

4. An integrated-circuit store according to claim 3, wherein said disabling means comprises a programmable connective device.

5. An integrated-circuit store according to claim 3, wherein said disabling means comprises a semipermanent voltage-programmable transistor.

6. An integrated-circuit store according to claim 3, wherein said disabling means comprises a fuse.

7. An integrated-circuit store according to claim 1 wherein said disabling means comprises a programmable connective device.

8. An integrated-circuit store according to claim 1 wherein said disabling means comprises a fuse.

* * * * *